(12) United States Patent
Cammack

(10) Patent No.: US 11,383,308 B2
(45) Date of Patent: Jul. 12, 2022

(54) DRILL GUIDE WITH CANTING BASE AND DOWEL JIG ATTACHMENTS

(71) Applicant: Charles Hadley Cammack, Lenexa, KS (US)

(72) Inventor: Charles Hadley Cammack, Lenexa, KS (US)

(*) Notice: Subject to any disclaimer, the term of this patent is extended or adjusted under 35 U.S.C. 154(b) by 271 days.

(21) Appl. No.: 16/778,616

(22) Filed: Jan. 31, 2020

(65) Prior Publication Data

US 2021/0237173 A1 Aug. 5, 2021

(51) Int. Cl.
*B23B 47/28* (2006.01)

(52) U.S. Cl.
CPC ........ *B23B 47/288* (2013.01); *B23B 2247/10* (2013.01); *B23B 2247/12* (2013.01)

(58) Field of Classification Search
CPC .............. B23B 47/288; B23B 2247/10; B23B 2247/12; B23B 2260/0482; B23B 47/281; B23B 47/28; B23B 2247/18; B23B 47/287; B23B 2247/04
See application file for complete search history.

(56) References Cited

U.S. PATENT DOCUMENTS

| | | | | |
|---|---|---|---|---|
| 2,522,400 A | * | 9/1950 | Polkosnik ............. | B23B 47/288 408/104 |
| 2,849,900 A | * | 9/1958 | Heidtman, Jr. ...... | B25H 1/0078 408/112 |
| 2,903,920 A | * | 9/1959 | Blecha ................... | B23B 47/28 408/115 R |
| 2,934,979 A | * | 5/1960 | Hartje ................... | B23B 47/288 408/103 |
| 2,991,668 A | * | 7/1961 | Keller .................. | B23Q 16/007 408/76 |
| 3,465,620 A | * | 9/1969 | Hilburn ................. | B23B 47/287 408/115 R |
| 3,534,639 A | * | 10/1970 | Treichler ............. | B25H 1/0078 408/112 |
| 3,775,020 A | * | 11/1973 | Stoutenberg ............ | B23B 49/02 408/115 R |
| 4,461,603 A | * | 7/1984 | Klee ....................... | B23B 47/28 408/115 R |
| 4,594,032 A | * | 6/1986 | Warburg ............... | B23B 47/288 408/115 R |

(Continued)

*Primary Examiner* — Eric A. Gates
*Assistant Examiner* — Paul M Janeski
(74) *Attorney, Agent, or Firm* — Hovey Williams LLP; Kameron D. Kelly

(57) ABSTRACT

This invention includes a drill guide (drill depth stop and alignment tool), canting base attachment, and self-aligning dowel jig attachment that allows users to drill holes to prescribed depths into flat work surfaces using various sizes of twist and auger bits while eliminating marring and reducing wood splintering. The canting base attachment allows users to drill holes to prescribed depths and at variable angles into flat surfaces and both large and small cylinders with no free ends using various kinds and sizes of drilling tools without marring. The dowel jig attachment allows users to drill dowel holes to prescribed depths in edges and faces of work pieces that are evenly spaced apart by numerous gauged distances and at infinitely adjustable distances from edges. This invention has drill press-like capabilities and can be used in fields and shops.

23 Claims, 20 Drawing Sheets

(56) References Cited

U.S. PATENT DOCUMENTS

| | | | | |
|---|---|---|---|---|
| 5,415,502 A | * | 5/1995 | Dahlin | B23B 47/28 |
| | | | | 408/115 B |
| 5,797,708 A | * | 8/1998 | Bencic | B23B 47/281 |
| | | | | 408/103 |
| 5,807,033 A | * | 9/1998 | Benway | B23B 47/288 |
| | | | | 144/346 |
| 6,233,799 B1 | * | 5/2001 | Bennett | B23B 47/28 |
| | | | | 408/115 B |

* cited by examiner

DRILL GUIDE WITH CANTING BASE AND DOWEL JIG ATTACHMENTS

RELATED APPLICATION

This application claims the priority benefit of U.S. Provisional Patent Application Ser. No. 62/814,170 filed 5 Mar. 2019 which is incorporated by reference herein.

BACKGROUND OF THE INVENTION

Field of the Invention

Charles Hadley Cammack, a US citizen and resident of Lenexa, Kans. located in Johnson County has invented a drill guide that facilitates drilling, tapping, auguring, and similar functions and allows users to drill holes to prescribed depths perpendicular to flat working surfaces with no marring and reduced splintering of wood using hand-held electric drills. This invention allows users to drill holes to precise depths and at variable angles into flat work surfaces and both large and small cylinders using various kinds and sizes of drilling tools including twist, spade, auger, Forstner, and brad-point bits as well as countersinks, unibits, and taps. This invention can be placed on cylinders whereas other inventions require that cylinders be placed within them for drilling. This invention thus allows the drilling of holes at various angles of inclination through the center of both large and small diameter cylinders and cylinders having no free end. This invention allows users to drill dowel holes on edges and faces of work pieces that are spaced apart by various gauged distances and aligned at precise distances from work piece edges.

Drill presses allow users to drill holes to precise depths and alignments in work pieces small enough to fit within them. This invention allows users to drill holes to precise depths and alignments in work pieces that are too large for drill presses and can thus be used in the field and shops.

This invention does not require tools for adjustment and does not need to be fully disassembled for adjustment; thus, individual parts should never be lost. This invention supports the use of multiple drill tool diameters and types without changing components of this invention.

BRIEF SUMMARY OF THE INVENTION

Drill Guide

The drill guide with no attachments allows users to align holes perpendicular to flat working surfaces and to drill to precise depths with no marring and reduced splintering of wood. The drill guide supports the use of drilling tools having bits that are the same diameter as their shanks including twist, auger, and brad point bits. Multiple bit diameters can be used in the drill guide.

Holes can be drilled to precise depths perpendicular to work surfaces even if the drill guide must be held in an awkward position. For example, holes can be drilled into one side of a wooden post while standing on the opposite side.

Canting Base Attachment

The drill guide includes a centering and indexing system that properly aligns itself with its attachments. The canting base attachment includes an indexing system that conforms to the indexing system formed in the drill guide.

The drill guide, when mounted on a canting base attachment, supports the use of drilling tools having bits that are the same size as their shanks as well as drilling tools having bits that are larger in diameter than their shanks including Forstner and spade bits, countersinks and unibits. Drilling depth is precisely controlled; thus, countersink holes are properly formed, and unibits repeatedly form correctly sized holes in thin metal sheets. The canting base permits users to drill holes through the center of large and small diameter cylinders and cylinders having no free end. Holes can be drilled to precise depths that are inclined at variable angles relative to flat or cylindrical work surfaces using many kinds of bits. Canting angles can be accurately set and marring of work surfaces is prevented.

The canting base includes gauge structures that permit operators to place it on the work piece so that the drill bit passes through the marked hole location even when the marked location is not visible when drilling. This invention supports both common drilling tasks and the drilling of holes where operators are in awkward positions.

Dowel Jig Attachment

The dowel jig attachment to the drill guide enables users to drill multiple dowel holes to prescribed depths in the edges and faces of work pieces that are evenly spaced apart and accurately aligned at one setup location. Self-centering dowel jigs can only be used correctly on uniformly thick edges of work pieces having zero or two veneered or finished faces. If work pieces have only one finished or veneered face, then holes should be located at work pieces' structural centers, not their geometric centers. It is often desirable to locate dowel holes closer to one face than another to increase joint strength. Self-centering dowel jigs cannot be used on the broad faces of work pieces.

Like other dowel jigs, this dowel jig must be properly positioned on an edge or face of a work piece at a first location. This dowel jig attachment is termed self-aligning rather than self-centering because the dowel jig can be automatically and correctly positioned at a second location on an edge or face by simply placing it against the work piece using a previously drilled hole and the work piece edge as guides. This dowel jig does not force users to place dowels at the geometric center of an edge. Good joinery requires that the face-to-dowel hole distance be constant and does not require that dowel holes be placed at the geometric center of work pieces. Consider a shelf supported by dowels. For reason of increased strength, dowel holes will desirably be located below the shelf's geometric center. With this self-aligning dowel jig, dowel holes can be accurately located at any location including geometric and structural centers.

With the dowel jig brace removed, the dowel jig attachment can be placed at any location on faces of work pieces. Dowel holes for shelving can be installed that do not fully penetrate the work piece because holes will be drilled to prescribed depths. The dowel jig attachment will be secured to a standard fastened to the work piece.

Description of the Prior Art

Prior art includes drill depth stops composed of cylinders (collars) having interior diameters only slightly larger than the constant diameter bits to which they are attached. U.S. Pat. No. 5,382,120 calls for a collar to be attached to a bit at a point where the distance between drill bit tip and collar is equal to planned hole depth. Operators advance bits until drill collars contact work surfaces. Marring may occur when rotating collars strike working surfaces, and wood splintering may occur around holes.

In a first collar type, a threaded hole extends radially inward through the collar wall toward the bit center. Collars become rigidly attached to bits when set screws are advanced in threaded holes until they strongly contact the lands of the bits. A different collar is required for each bit diameter, and users must be careful to avoid damaging the drill bit flutes when tightening the set screw against the bit.

In a second collar type, an extension is formed on each free end of a C-shaped collar. One extension has a threaded hole through it and the other extension has a smooth circular hole (no thread). A set screw passes through the smooth hole into the threaded hole in the opposing extension. Collars are placed on bits at proper points, then screws are turned until collars grip bits fixing them in place.

A third collar type consists of two short cylinders joined by a coiled spring as disclosed in U.S. Pat. No. 4,138,200A. A first cylinder is fixed to the drill bit using a set screw (first collar type) while a second floating cylinder is attached to the first cylinder via a coiled spring. The spring compresses when the floating cylinder strikes the working surface, but the floating cylinder stops rotating thus preventing marring of the working surface. Drilling continues until the spring is fully compressed. Marring is prevented, but this system is complex and is not robust.

A fourth collar type does not lead to marring of work surfaces. For example, U.S. Pat. No. 8,876,444 discloses a collar that includes springs that allow the bottom part of the sleeve to stop rotating when that piece meets the working surfaces. In another type, two cylinders are connected by two races and a set of ball bearings. One cylinder is attached to the bit (first collar type) while the second rotates with the first cylinder until contact is made with the working surface. Marring is largely prevented, and depth of drilling is limited. However, this system is costly, complex, and requires a new device for each drill bit size.

None of these devices keep drill bits aligned perpendicular to work surfaces or work with drilling tools having shanks that are smaller than their bits. The more expensive collars prevent marring, but the inexpensive collars due mar.

Prior art also includes cylinders that fit tightly over drill bit flutes. U.S. Pat. No. 5,078,552 discloses a cylinder that fits over drill bits that are inserted partway into drill chucks positions that set the correct depth of penetration when a cylinder strikes the work surface. Slippage of shanks within chucks will often occur with heavy drilling unless drill bits are fully inserted into drill chucks. These cylinders do not enable the drilling of holes at precise angles relative to work surfaces and do not align bits perpendicular to working surfaces. Marring of working surfaces and splintering of wood may occur.

Prior art also includes a tool that consists of a square, clear plastic plate and a cylinder mounted at its center. Numerous steel cylinders (bushings) resembling sockets having the same outside diameter but differing inside diameters are included with the tool. A single bushing is inserted into the plastic cylinder creating a drill guide. This tool reduces splintering and does not mar working surfaces but does not include a method of controlling depth of drilling. Only bits having a constant diameter can be used with this tool.

Prior art also includes placement of tape around twist and auger bits, and insertion of wires into drill chucks. The tape tends to deform when it meets the work surface changing the depth of penetration. Wires tend to mar work surfaces. None of these systems support precise drill alignment or drilling tools having shanks that are smaller than their bits.

U.S. Pat. No. 3,100,408A provides what is termed a portable drill press. This patent discloses a depth stop and guide device that includes a ring base, two long rods, and a bracket that engages the two rods and supports a second drill chuck. A depth stop is fixed to one rod at an appropriate point. Advancement of the drill bit stops when the bracket strikes the depth stop. The rods can be aligned perpendicular to the base or at modest angles. The top of the base includes beveled notches that permit the drilling of holes through the center of small cylindrical objects placed within the tool. This device is very functional but expensive, cumbersome, and does support the drilling of holes through the center of large diameter cylinders. This tool can be used with bits having constant diameters or bits that are larger than their shanks. This tool does not mar working surfaces but does not reduce splintering. The drill is fastened to the tool when in use, cannot be used for other tasks until separated from the tool, and is heavy.

US 24390008A provides what is termed a drill stand. This patent discloses a depth stop and guide device that includes a large diameter circular base ring that bears on working surfaces and a small diameter upper ring supported by members extending upward from the ring. Bushings of various sizes are mounted in the upper ring. The shank of a drilling tool passes through a bushing mounted within the upper disc. This device allows users to drill holes that are aligned perpendicular to working surfaces. If the drilling tool shank is fitted with a depth stop collar, holes can be drilled to prescribed depths. This device is attached to the drill because the bit cannot pass through the bushing. This device cannot be used to properly drill inclined holes even when placed on a beveled shim because the large diameter bits will bear unevenly on working surfaces. This device is commonly used with special Forstner bits having long shanks. If the device is modified to serve drilling tools having bits and shanks of the same size, the required length of tool becomes excessive, and a different bushing is required for each drilling tool diameter.

Many existing dowel jigs like the tool disclosed in U.S. Pat. No. 5,782,006A are termed self-centering because they automatically place the bit at the center of an edge of a first work piece when clamped to that work piece. This functionality allows holes to be drilled in the exact center of an edge of a first work piece. However, these devices cannot be used to drill dowel holes in the broad face of a second work piece that is to be joined to the first work piece thus limiting their usefulness.

In general, sleeves and collars reduce the length of bit available for drilling making it necessary to purchase longer bits and they do not align bits perpendicular to working surfaces unless used in combination with other tools. Such tools cannot be used with drilling tools having bits that are larger than their shanks. Many such tools are designed for just one task.

OBJECTS AND SUMMARY OF THE INVENTION

Many existing depth stop tools can limit hole depth but cannot align drilling tools perpendicular to working surfaces or at various prescribed angles relative to working surfaces. Some tools serve to align bits perpendicular to working surfaces but cannot limit hole depth unless used in combination with other tools. Many existing depth stop tools rotate when they contact working surfaces marring them. Most depth stop tools do not reduce splintering of wood. Most depth stop tools only support the use of tools that have bits and shanks of the same diameter. One drilling tool maintains the tool perpendicular to flat working surfaces and limits hole depth, but only supports tools that have bits larger in diameter than their shanks (one shank size). Additionally, it is necessary to remove the drilling tool from the depth stop and alignment tool to change bits. This device also requires long drilling tools.

It is therefore an object of the present invention to allow users to drill holes to prescribed depths that are aligned normal to work surfaces without marring and with reduced splintering of wood using drilling tools of multiple sizes that have bits and shanks of the same size.

It is a further object of this invention to allow users to drill holes to prescribed depths that are aligned normal to work surfaces using drilling tools having bits that are the same size or larger than their shanks without marring of the working surface.

Some depth stop tools can be used to drill through the center of small cylindrical objects placed in them but cannot be used on large diameter pipes or on installed pipes having no free ends. It is an object of this invention to allow users to drill holes to prescribed depths through the center of large and small cylindrical objects in both shops and fields, and at variable inclinations, even if they have no free ends.

No existing depth stop tools that attach to twist bits can be used with drilling tools having bits larger in diameter than their shanks. Many existing depth stop tools are secured to bits using a set screw that can be easily lost and which requires a tool for operation. Set screws must bear on the lands of bits to work properly and to avoid damaging drill tools. Other depth stop tools are disposable, lack precision, or deform during use changing depth control. Another kind of collar fits several sizes of bits, but has an appreciable length reducing the maximum depth of drilling for a given bit length.

It is an object of this invention to allow users to align drilled holes perpendicular to work surfaces and to control the depth of drilling when using drilling tools having bits that are larger than their shanks and to eliminate the need for supplemental tools and fasteners.

Self-centering dowel jigs cannot be used to drill dowel holes in the faces of flat work pieces. In addition, self-centering is not desired when work pieces have only one finished or veneered face, or when drilling dowel holes for mitered joints. It is therefore an object of this invention to permit users to drill evenly spaced-apart holes to specific depths into edges of work pieces that are located at constant distances from edges.

It is a further object of this invention to allow users to drill evenly spaced-apart dowel holes in the faces of work pieces.

It is an object of this invention to allow users to drill dowel holes for multiple bit diameters and variable spacings including standard spacings.

It is an object of this invention to allow the creation of both blind and through mitered joints.

BRIEF DESCRIPTION OF THE FIGURES

Figures showing the preferred embodiment of the invention are briefly described as follows.

DETAILED DESCRIPTION OF THE PREFERRED EMBODIMENT

Figure 1:
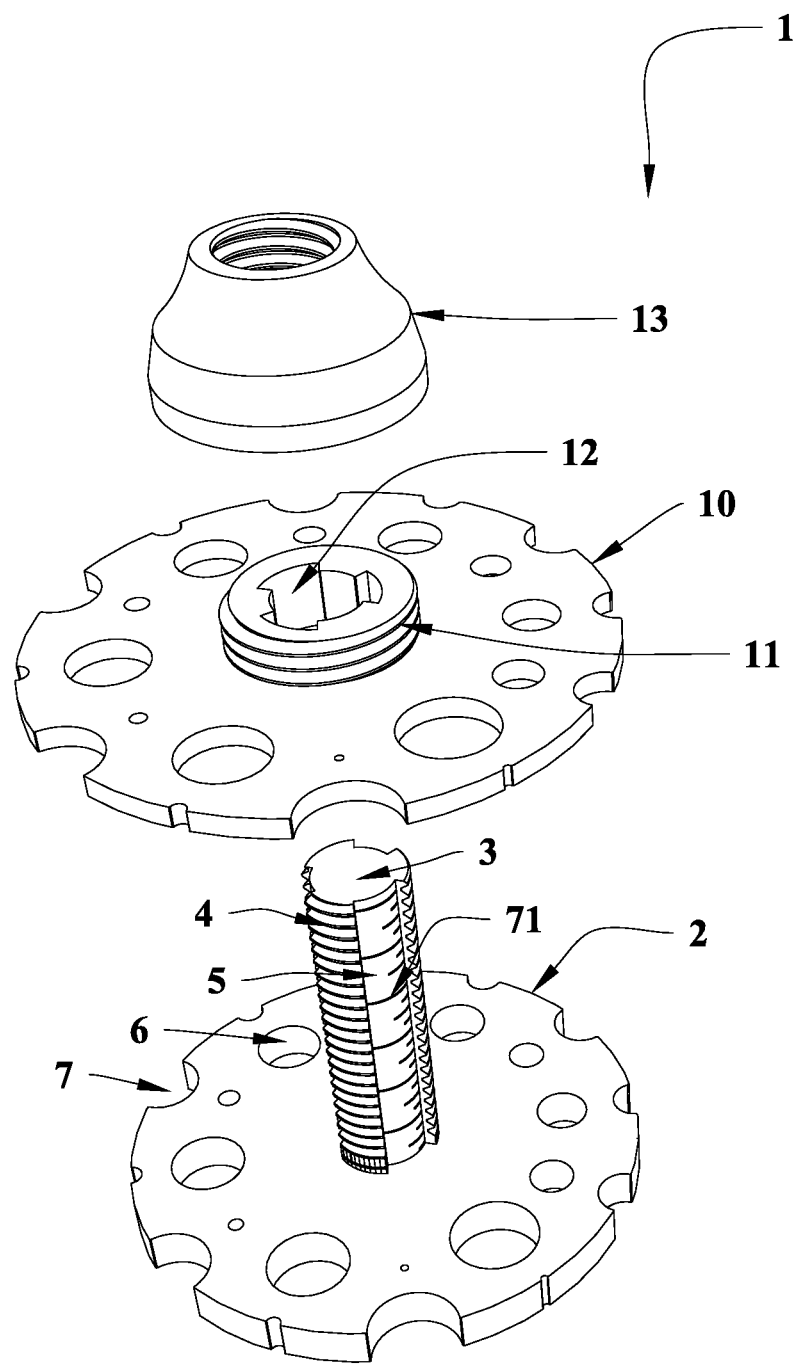
FIG. 1 depicts a vertically exploded view of the drill guide.

FIG. 1 shows the three primary components of the drill guide 1 in an exploded view: bottom plate 2, top plate 10, and double nut 13. The bottom plate has a threaded shaft 3 attached to its center, threads 4 interrupted by alignment grooves 5, multiple fully circular holes 6, multiple semi-circular edge notches 7, and depth graduations 71. The circular holes are located on a circle having a radius termed the Hole Radius.

Figure 2:
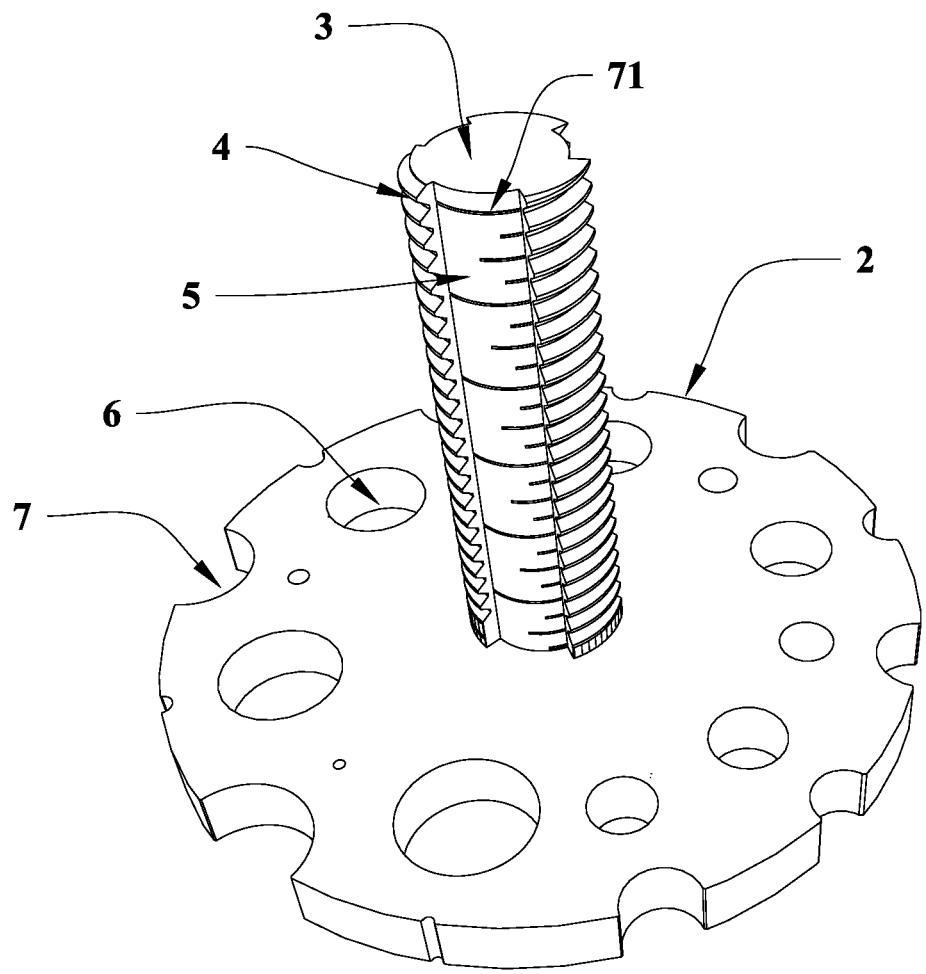
FIG. 2 depicts the bottom plate as seen from above.

FIG. 2 shows a top-isometric view of the bottom plate 2 and rigidly attached shaft 3 having threads 4 interrupted by alignment grooves 5. Depth graduations 71 are formed in one or more alignment grooves. Fully circular holes 6 and semi-circular notches 7 are arranged around the shaft in a favorable order. In this preferred embodiment, 12 circular holes are paired with 12 semi-circular notches, so the constant angular separation between hole centers is 30°. The largest fully circular hole is paired with the smallest notch on the same radial line. The second largest hole is paired with the second smallest notch on the adjacent radial line. This pattern is repeated around the perimeter of the bottom plate. Other arrangements are possible.

Multiple alignment grooves provide stability, proper alignment of top and bottom plates is maintained by making one alignment groove wider or narrower than all others.

Figure 3:
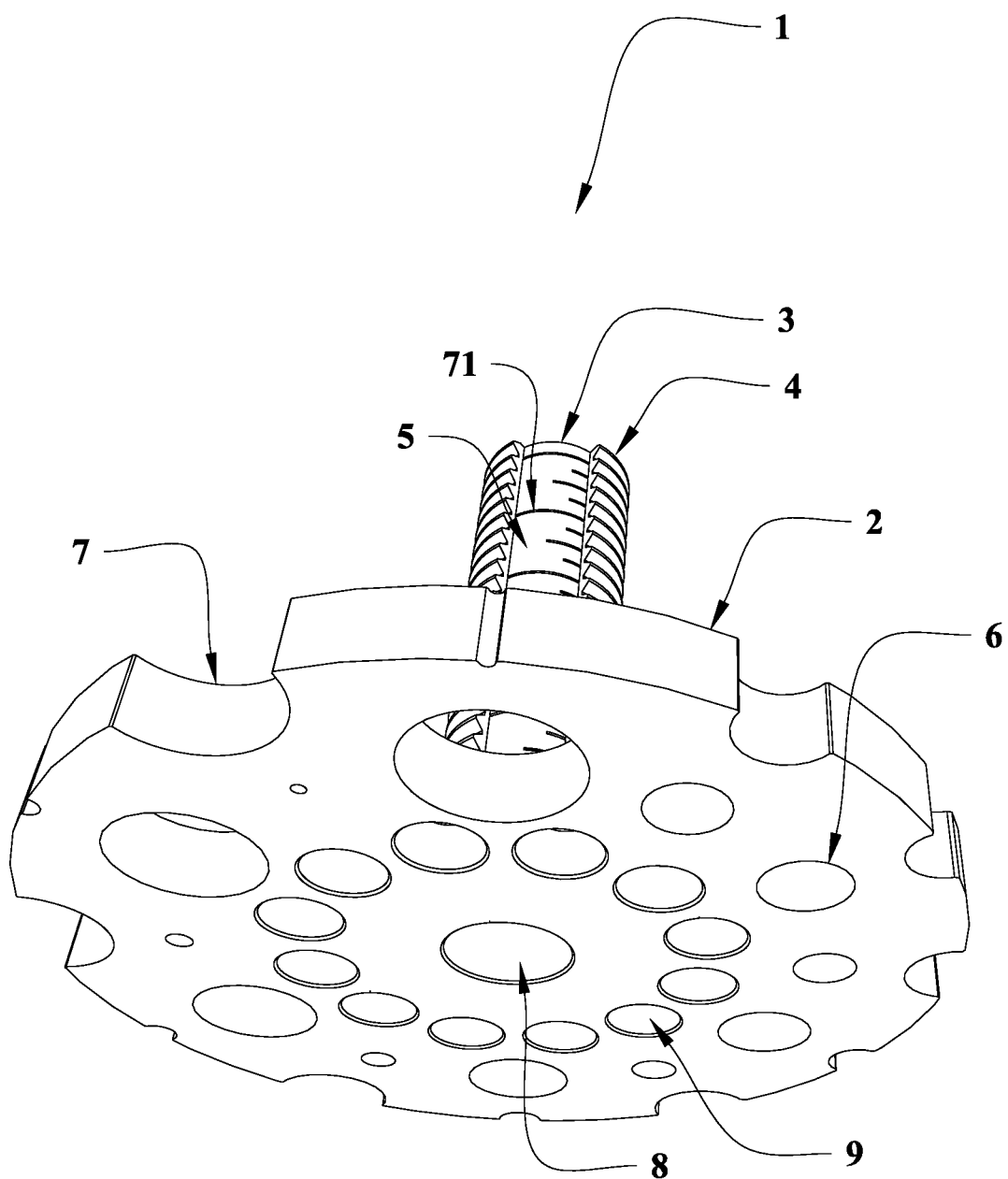
FIG. 3 depicts the bottom plate as seen from below.

FIG. 3 shows the bottom surface of the bottom plate 1. A center index recess 8 is located at the center of the bottom plate and numerous index recesses 9 are centered about it in a circle termed the Index Circle. The radius of the Index Circle is termed the Index Radius. These recesses form an indexing system that is aligned with the holes 6 and notches 7 in the plates. The shaft 3, threads 4, alignment grooves 5, and depth graduations 71 are also visible in this figure.

Figure 4:
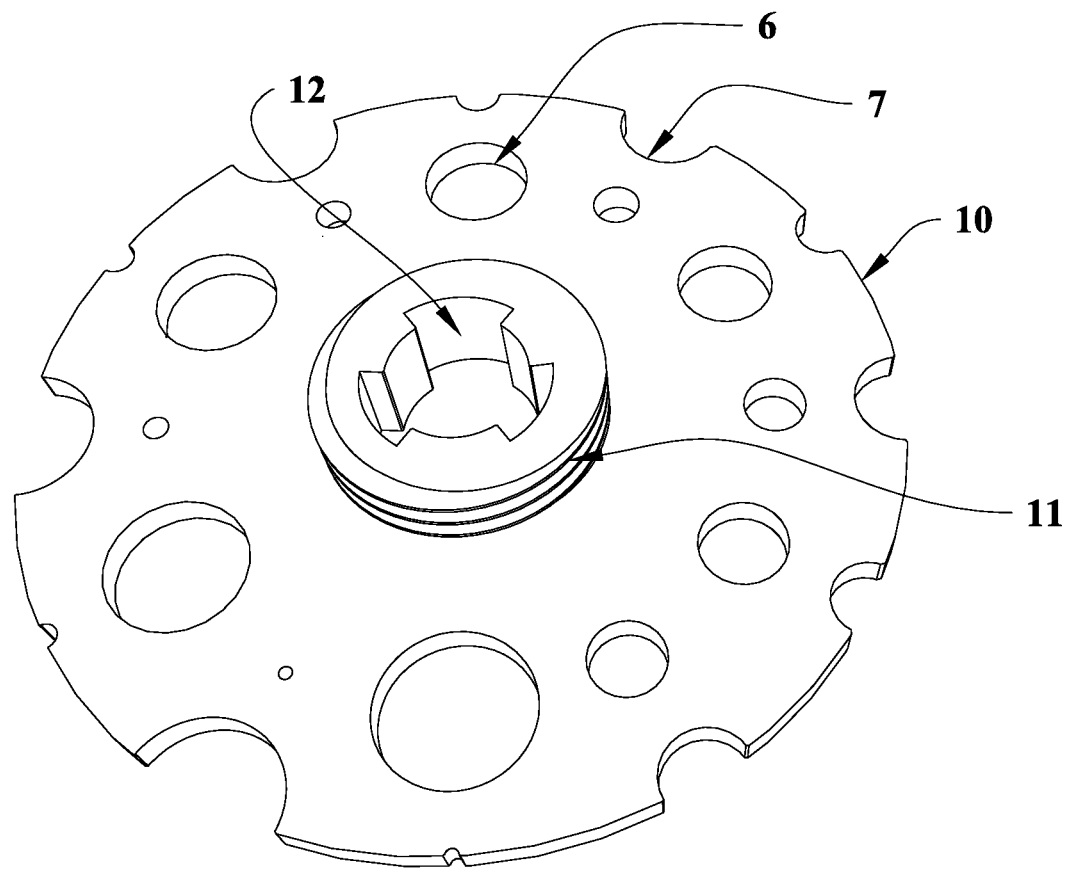
FIG. 4 depicts the top plate as seen from above.

FIG. 4 shows a top view of the top plate 10 and integral threaded collar 11. Fully circular holes 6 and semi-circular notches 7 matching those formed in the bottom plate in both size and arrangement are formed in the top plate. A threaded collar 11 and non-circular hole 12 are located at the center of the top plate 10. The non-circular hole conforms to the cross-sectional shape and size of the shaft attached to the bottom plate.

Figure 5:
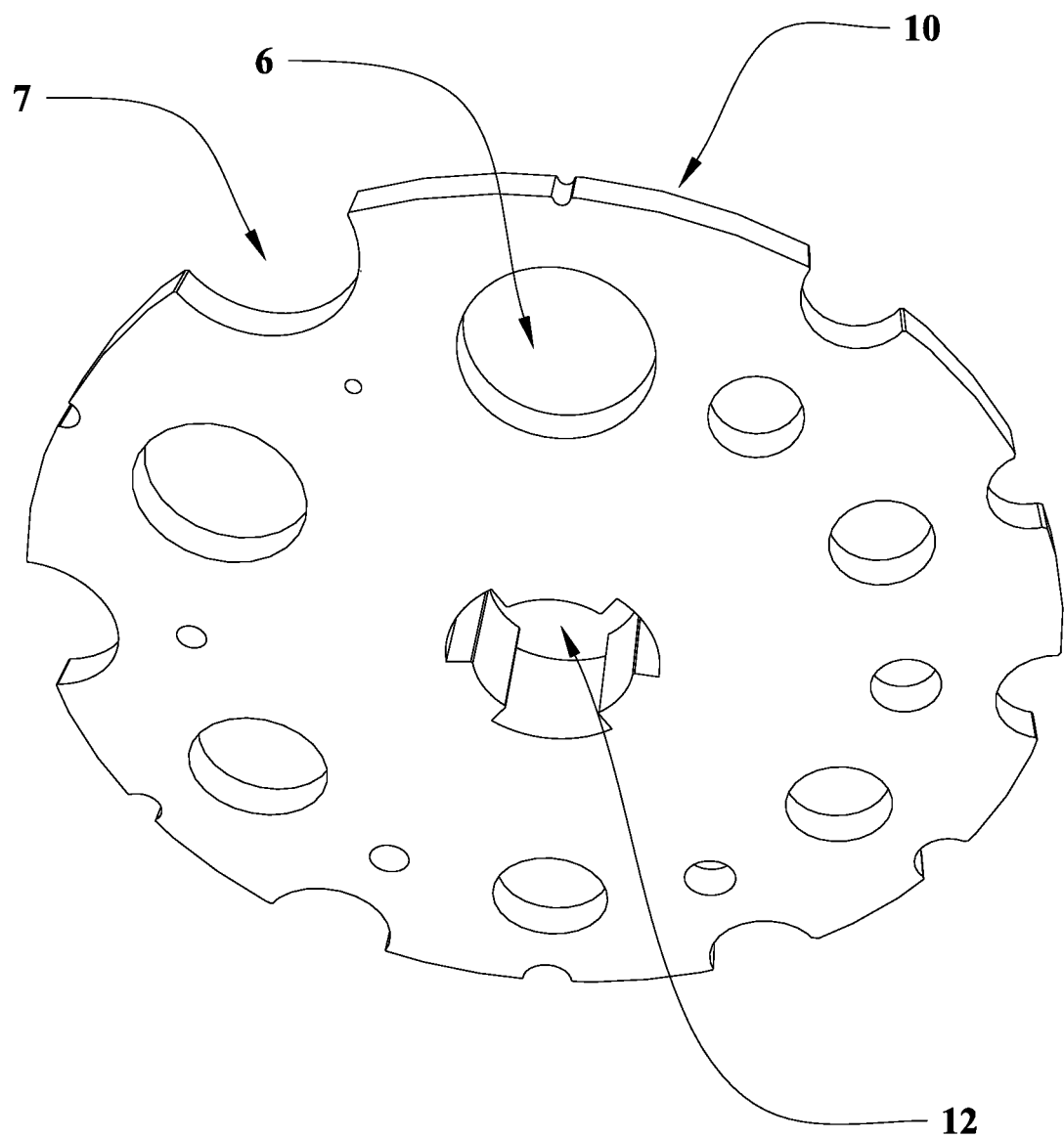
FIG. 5 depicts the top plate as seen from below.

FIG. 5 shows a bottom view of the top plate 10. No new features appear in FIG. 5.

Figure 6:
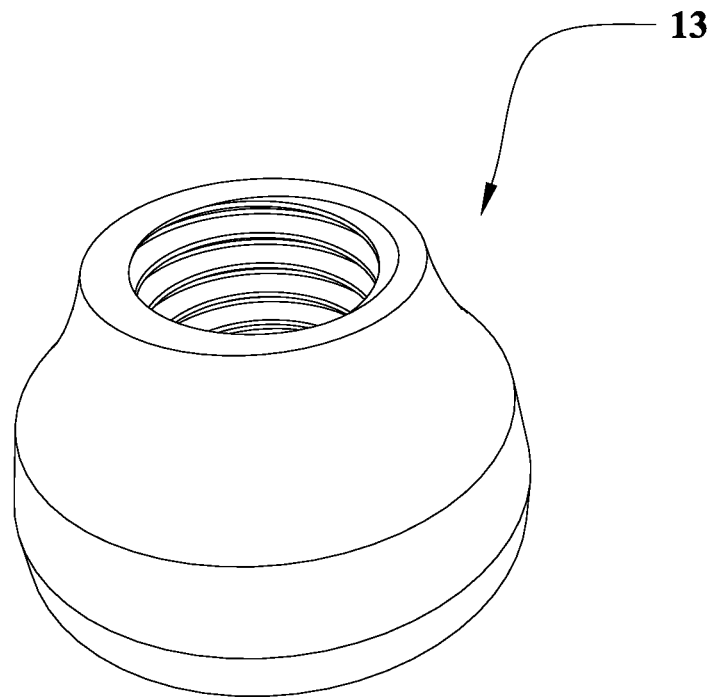
FIG. 6 depicts the double nut.

FIG. 6 shows an isometric view of the double nut 13.

Figure 7:
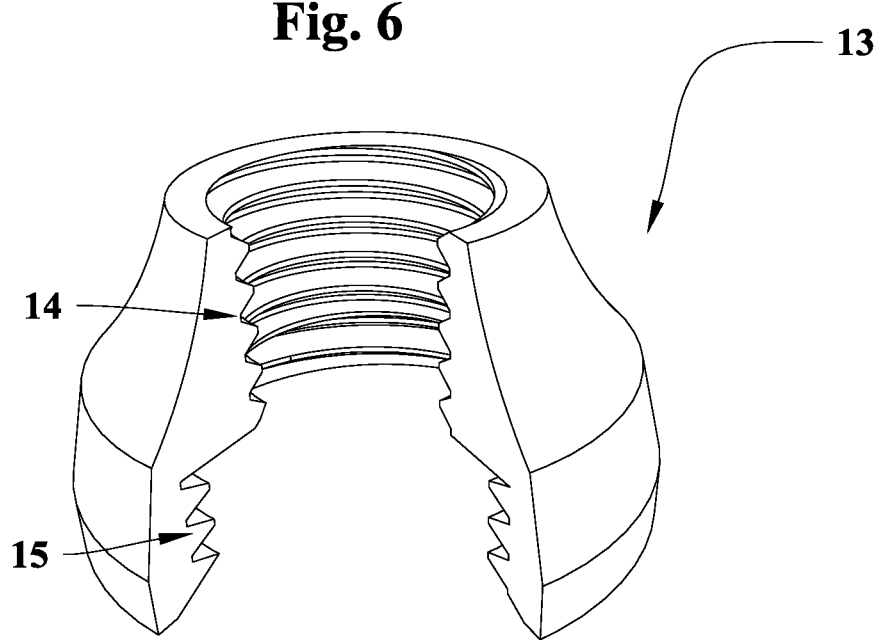
FIG. 7 depicts a double nut with a cutout.

FIG. 7 shows a cut-away view of the double nut with double-nut shaft threads 14 and double-nut collar threads 15 inside the double nut. The larger diameter collar threads at the bottom of the double nut engage the threaded collar on the top plate, and the smaller diameter shaft threads at the top of the double nut 14 engage the shaft threads on the bottom plate.

Figure 8:
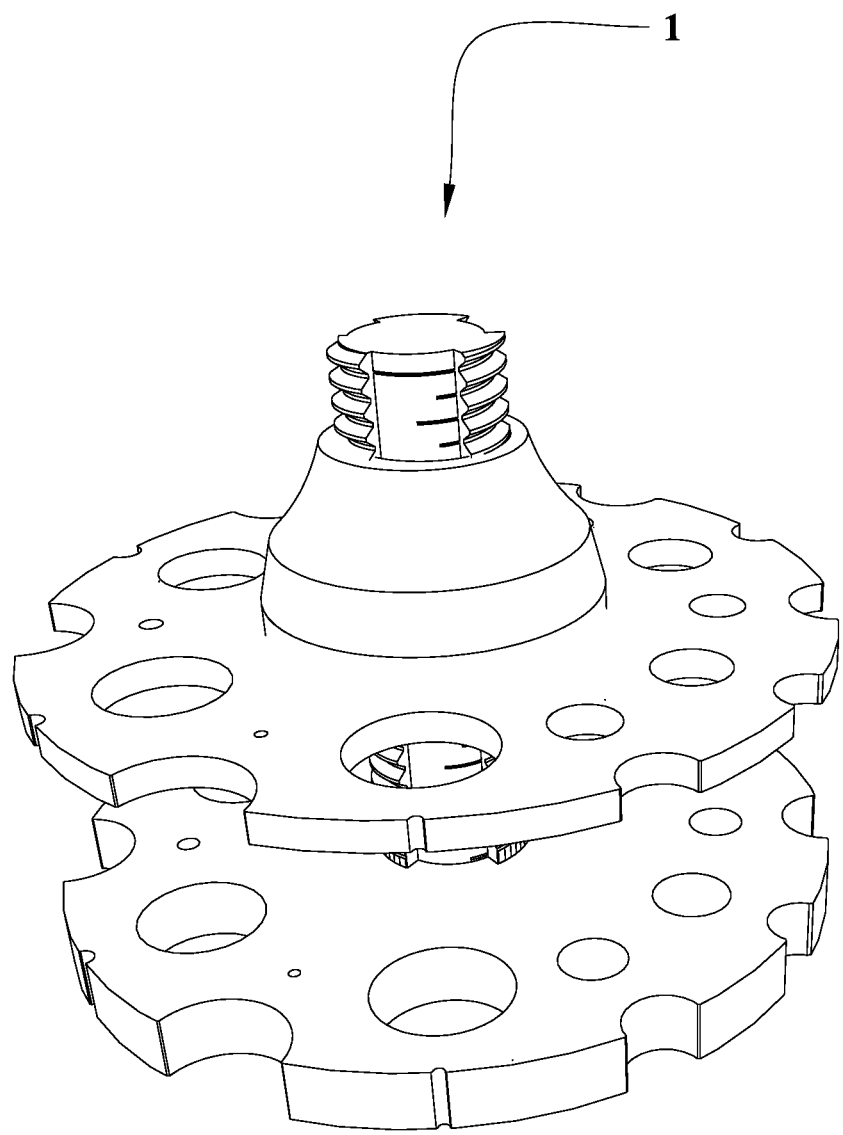
FIG. 8 depicts the assembled drill guide.

FIG. 8 shows the drill guide 1 as assembled.

Figure 9:
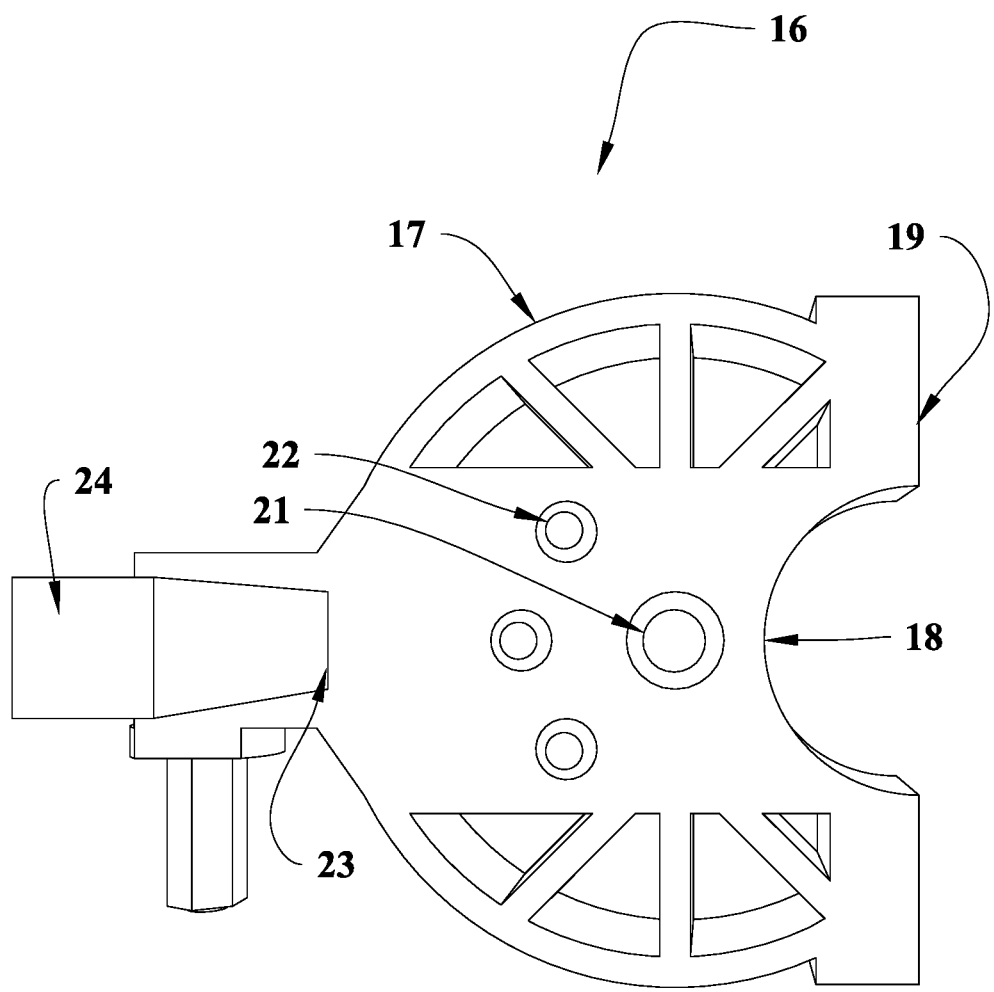
FIG. 9 depicts the canting base attachment as seen from directly above.

FIG. 9 shows a top view of the canting base attachment 16 that can be placed below a drill guide enabling the use of drilling tools having bits that are larger in diameter than their shanks and the drilling of holes through cylinder centers. The canting base block 17 is roughly circular in shape, has the same diameter as the top and bottom plates, and has an appreciable thickness. A large diameter drill bit recess hole 18 is formed on the periphery of the canting base block. A secant cut made through the center of the drill bit recess hole marks the front of the block and forms two front faces 19 that can have a width equal to the Hole Radius.

A center index pin 21 is located at the center of the top surface of the canting base block along with three index pins 22 that are offset from the centering pin by the Index Radius. A canting shaft 24 slides up and down within a canting shaft hole 23 in the canting base attachment.

Figure 10:
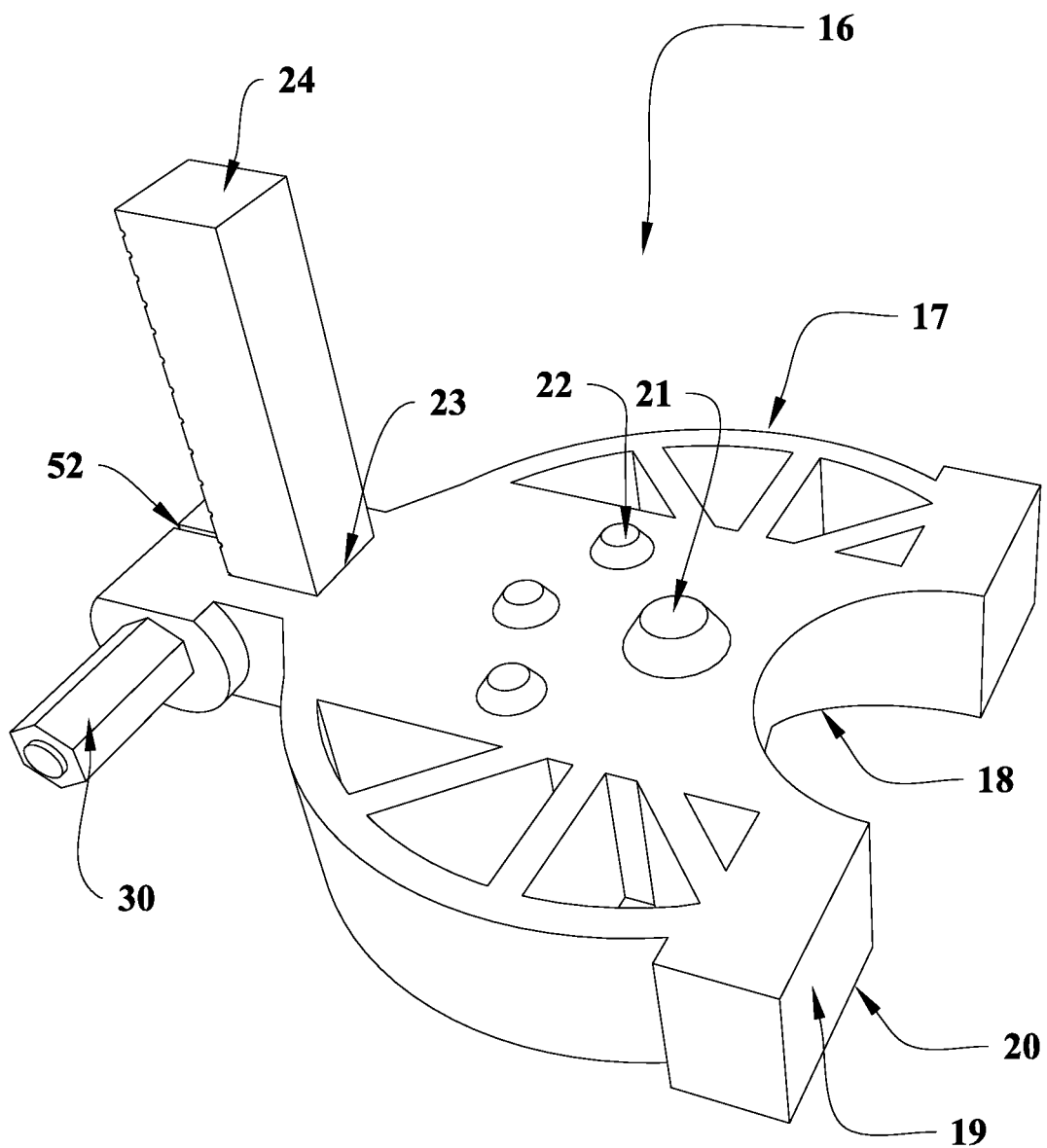
FIG. 10 depicts a top-front view of the canting base attachment.

FIG. 10 shows a top-front isometric view of the canting base attachment 16 having two upright, rectangular, front faces 19. The bottom edges of the two front faces form pivot edges 20. The canting shaft 24 can move up and down within the canting shaft hole 23 and can be fixed in place by rotating the clamping rod with knob 30 to close the gap 52 in the projection at the rear of the canting base attachment. Lowering the canting shaft causes the canting base to pivot around the pivot edges 20 when the attachment is placed upon a flat surface. A center index pin 21 and three index pins 22 are formed on the top of the canting base block 17.

Figure 11:
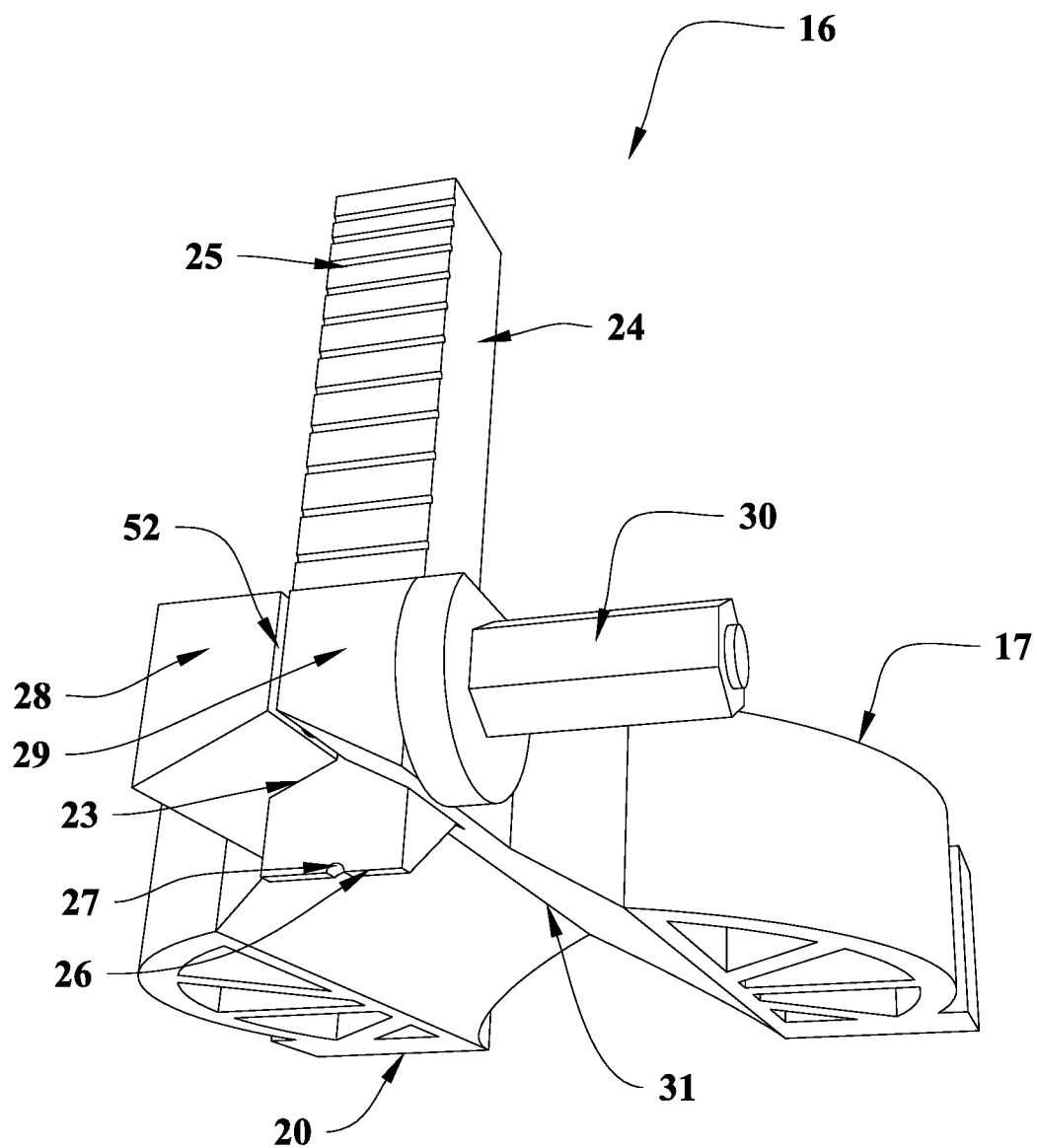
FIG. 11 depicts a bottom-rear view of the canting base attachment.

FIG. 11 shows a bottom-rear isometric view of the canting base attachment 16. A V-shaped groove 31 is formed in the bottom surface of the canting base attachment. This groove forces the canting base attachment to align itself with cylinders when placed upon them. A left projection 28 and right projection 29 extend rearward from the rear of the canting base block 17. The left and right projections are separated by a gap 5 and a canting shaft hole 23. A knob is fastened to a threaded rod forming the clamping rod with knob 30. The threaded rod passes through a smooth hole in the right projection (not visible in this view), the open gap, and through a threaded hole in the left projection 28 (also not visible in this view). Users may close the gap and clamp the canting shaft in place by rotating the clamping rod with knob 30 until the gap 52 is nearly closed. A straight canting shaft edge 26 is formed at the bottom end of the canting shaft 24. A center alignment notch 27 is formed at the center of the canting edge that is in alignment with the V-shaped groove 31.

If the canting shaft is moved downward so that the canting shaft edge is lower than the canting base, then the canting base will be rotated about the pivot edge 20 when placed on a flat working surface. Drill bit alignment will then be canted relative to flat or cylindrical work surfaces.

Angle graduations 25 can be formed on one or more surfaces of the canting shaft allowing users to set the proper canting angle without measuring when working with flat working surfaces.

Figure 12:
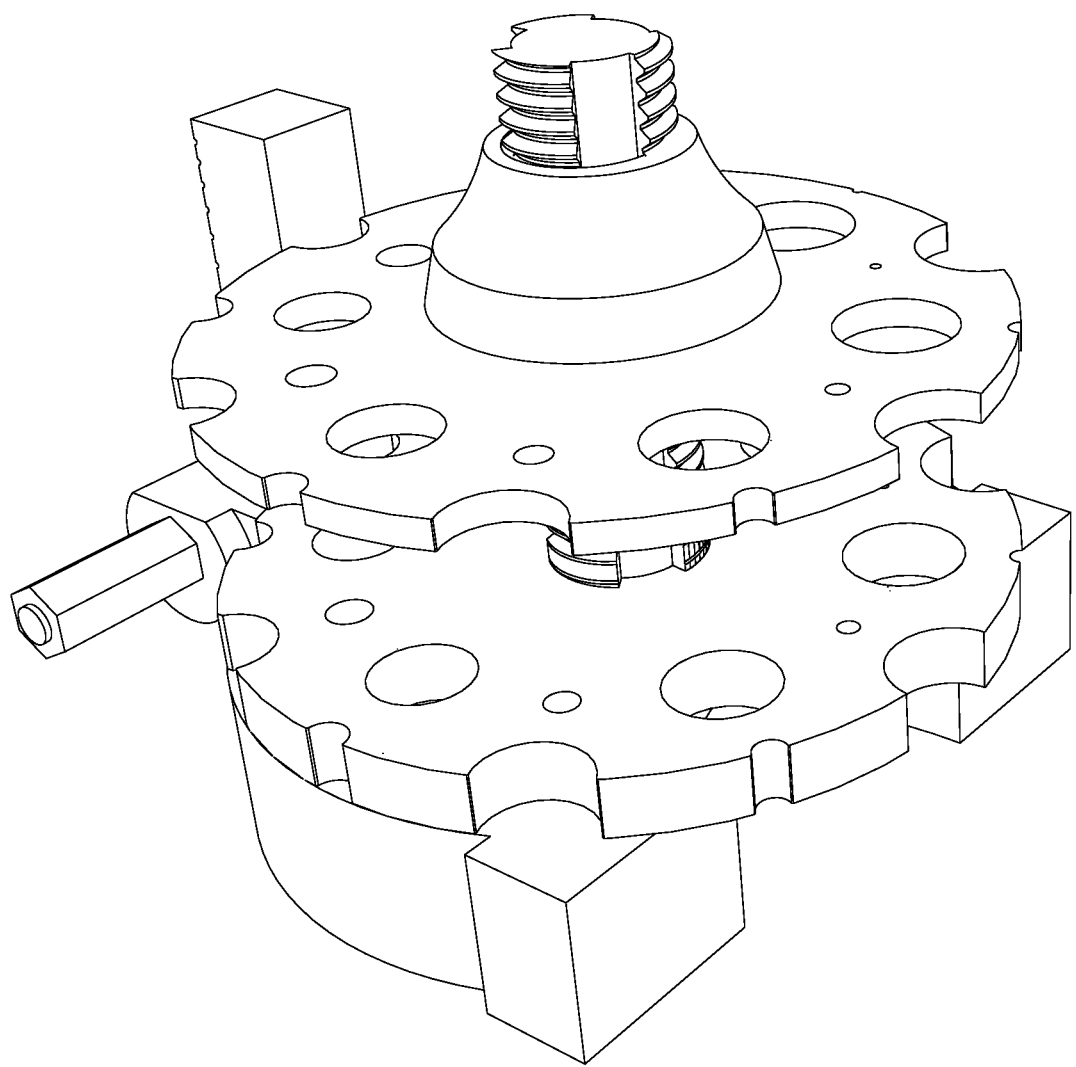
FIG. 12 depicts the drill guide resting on the canting base attachment.

FIG. 12 shows the drill guide in position on the canting base attachment.

Figure 13:
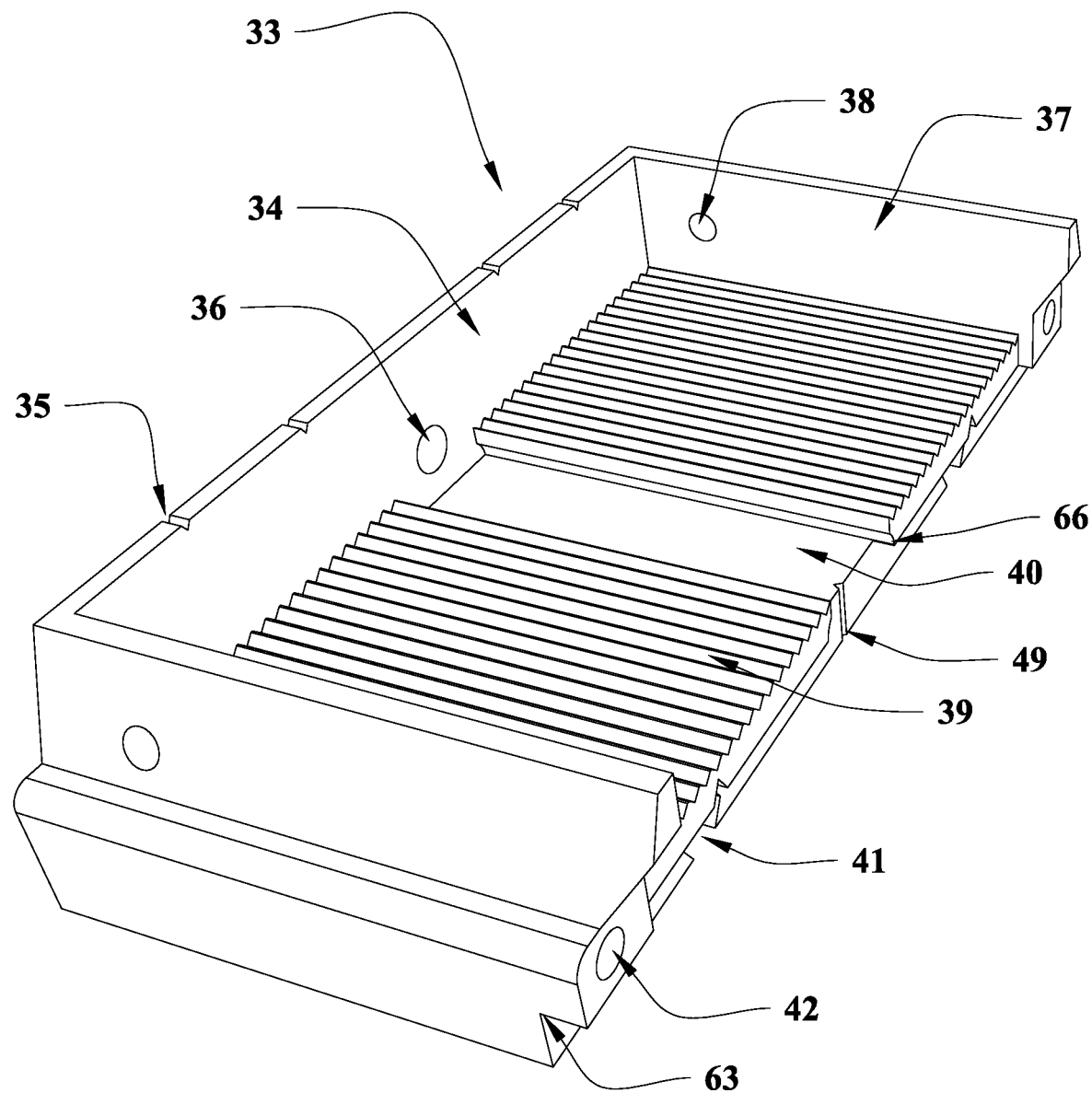
FIG. 13 depicts a top-front view of the dowel jig body.

FIG. 13 shows a top-front isometric view of the dowel jig body 33 that includes two grooved pans 39 and a center guide slot 40. Guide slot grooves 66 are formed on each side of the center guide slot. Two side walls 37 and a back wall 34 rise above the grooved pans 39. A control rod hole 36 is formed in the back wall, and an alignment rod insertion hole 38 is formed in each side wall. A smooth clamp rod hole 42 is formed in each side wall that extends from the front to back faces of the dowel jig body. A ledge 63 is formed on the front face of the dowel jig body. A centerline groove 49 is formed at the center of the front face of the dowel jig body. Jig spacing index notches 35 are formed on the top surfaces of the back wall that correspond to a standard dowel hole spacing interval. Brace fixture slots 41 are formed in the bottom face of the dowel jig body.

Figure 14:
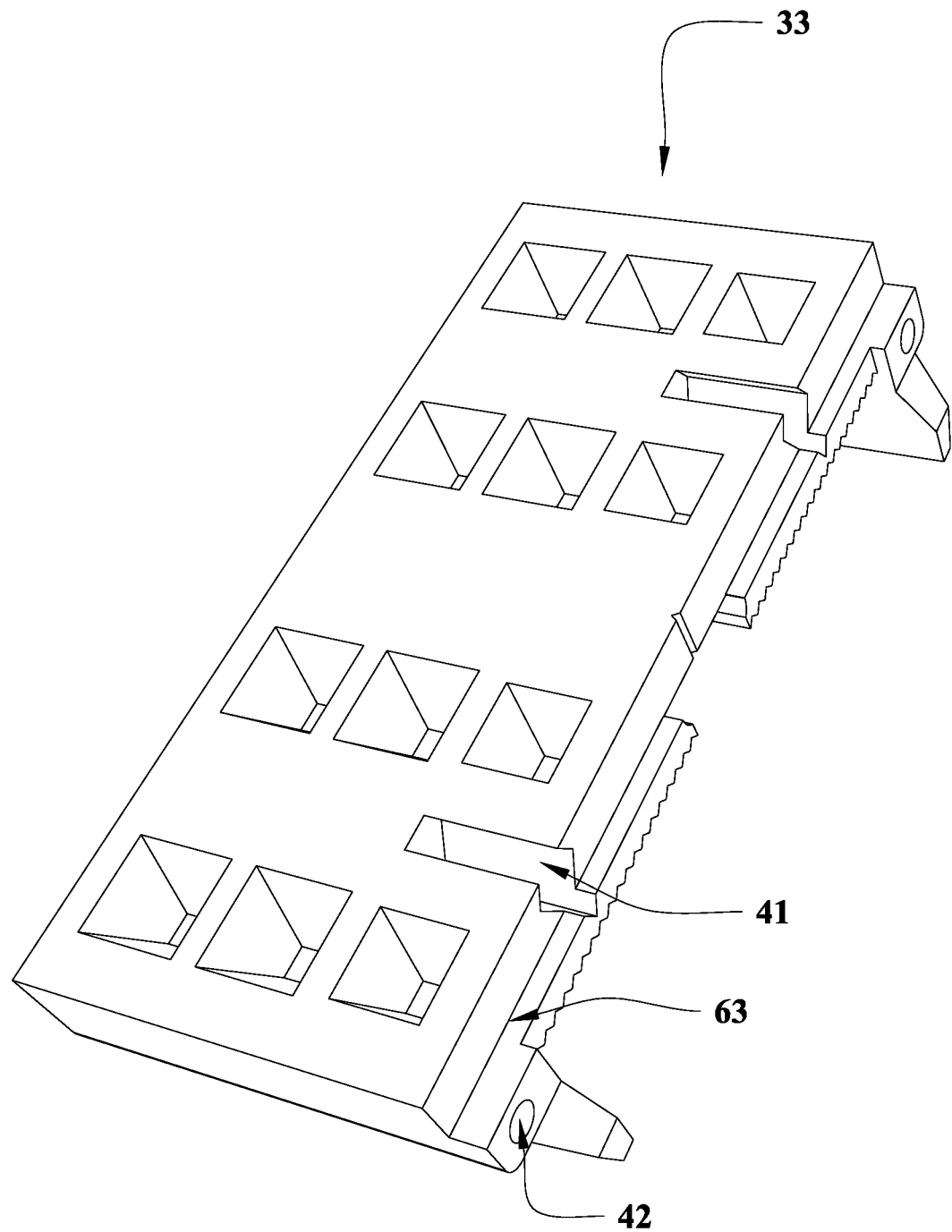
FIG. 14 depicts a bottom-front view of the dowel jig body.

FIG. 14 shows a bottom-front isometric view of a dowel jig body 33. Multiple brace fixture slots 41 are formed in the bottom face of the dowel jig body. A smooth clamp rod hole 42 extends from back to front through the dowel jig attachment. The dowel jig is properly positioned on a work piece when its ledge 63 rests on an edge of that work piece.

Figure 15:
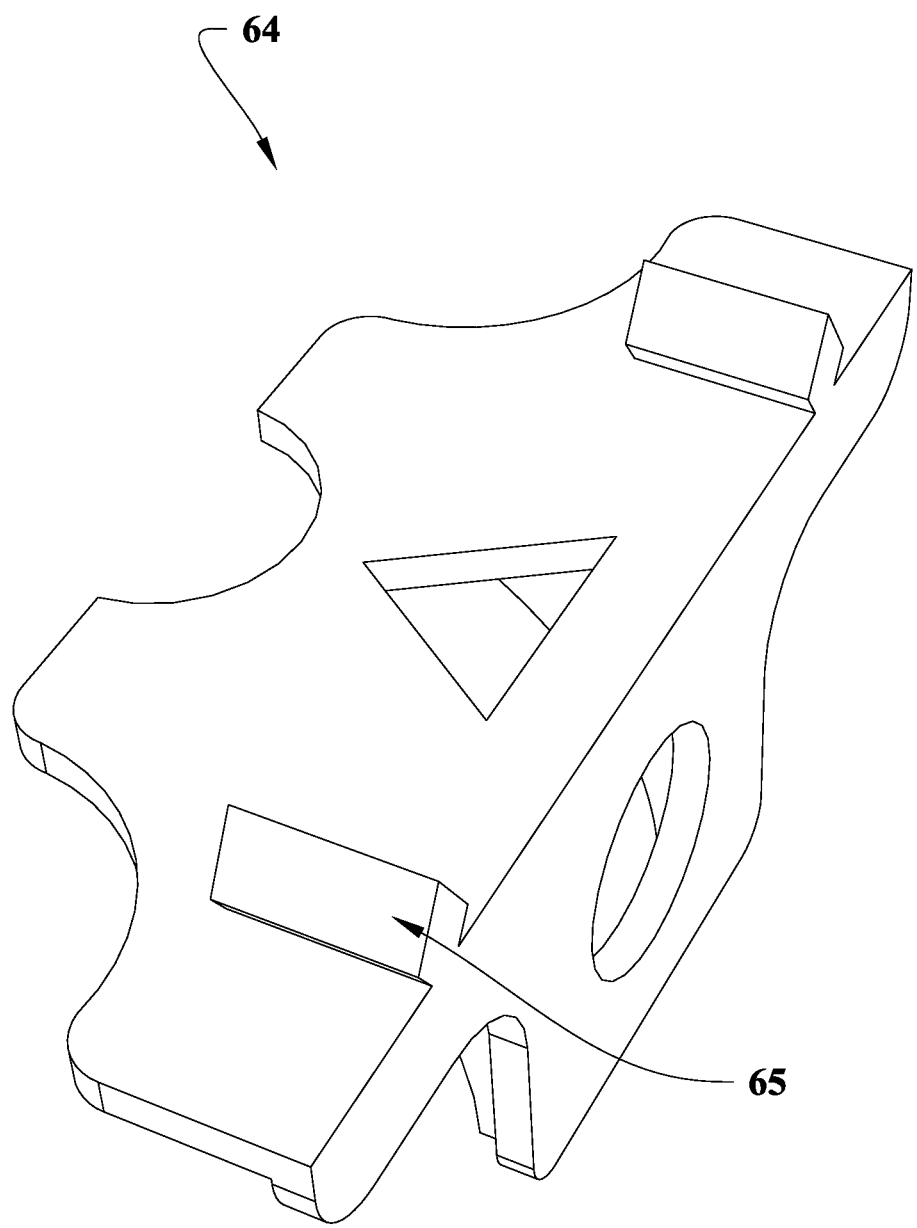
FIG. 15 depicts the dowel jig brace.

FIG. 15 shows a dowel jig brace 64 with brace fixtures 65 that slide within the brace fixture slots 41 shown in FIG. 14.

Figure 16:
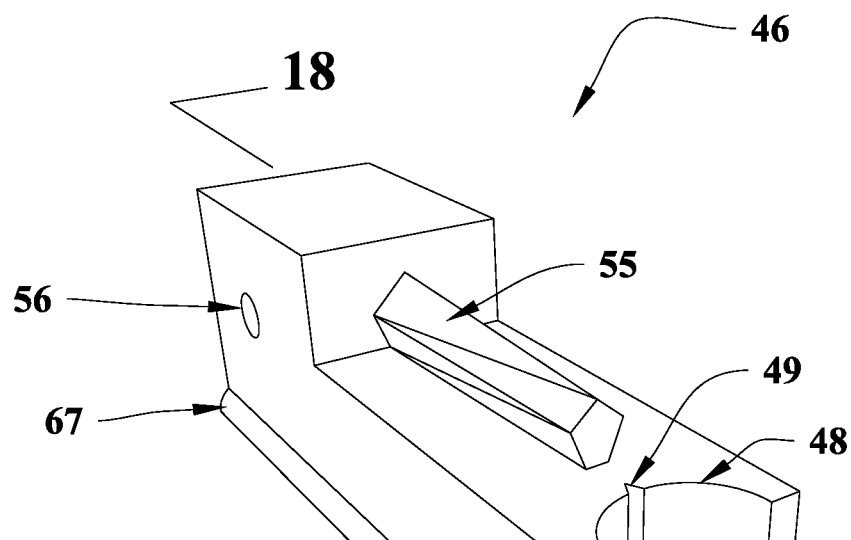
FIG. 16 depicts a top-front view of a center sliding block.

FIG. 16 shows a top isometric view of a center sliding block 46 with an adapter flange 55 projecting from its top surface. An alignment rod hole 56 extends laterally through the center sliding block. A guide slot projection 67 is formed at the bottom of long edges of the center sliding block.

Figure 17:
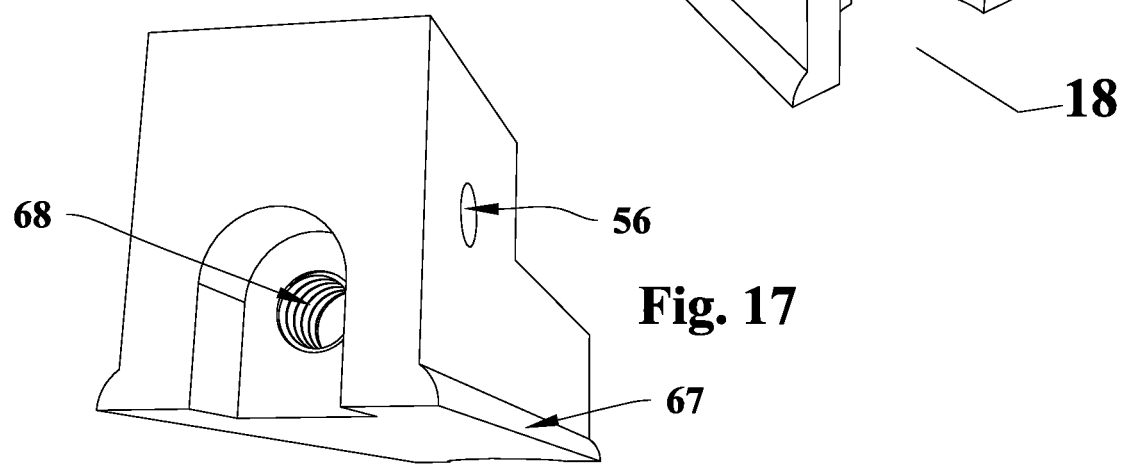
FIG. 17 depicts a bottom-rear view of a center sliding block.

FIG. 17 shows a bottom-rear isometric view of the center sliding block with a short threaded hole 68. The alignment rod hole 56 and guide slot projections 67 are visible in this figure.

Figure 18:
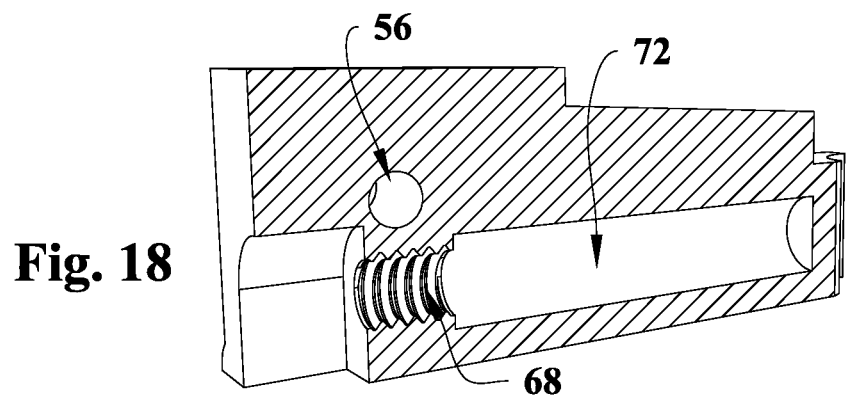
FIG. 18 depicts a sectional view of a center sliding block.

FIG. 18 shows a cut-away view of the center sliding block cut at its center. A short, threaded hole 68 and an open hole (control rod operating space 72) are visible in this view.

Figure 19:
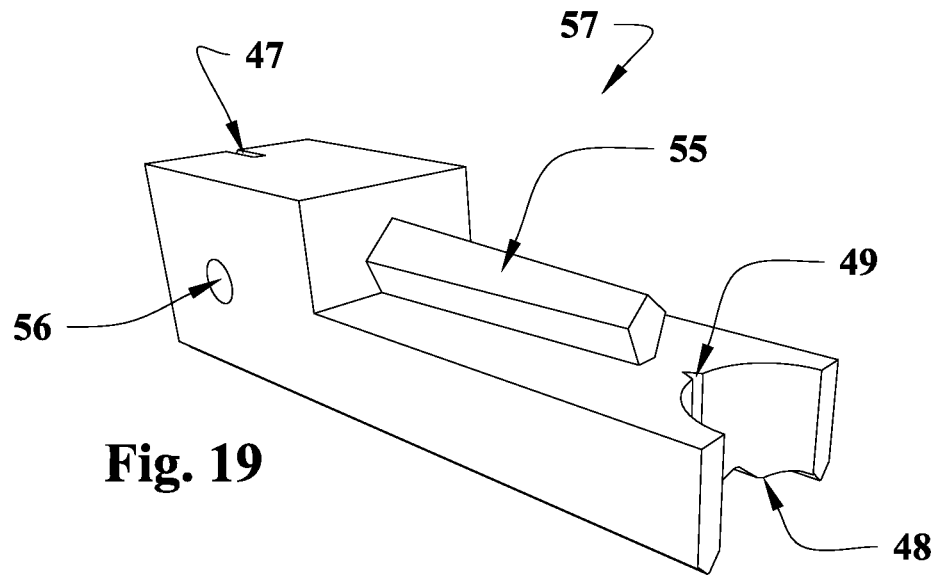
FIG. 19 depicts a top-front view of an outboard sliding block.

FIG. 19 shows a top-front isometric view of an outboard sliding block 57. A flange adapter 55 projects from its top surface, and an alignment rod hole 56 extends laterally through the rear of the outboard sliding block. An adapter center notch 47 and a centerline groove 49 mark the center of the outboard sliding block. A semi-circular dowel recess hole 48 is formed in the front face of the outboard sliding block.

Figure 20:
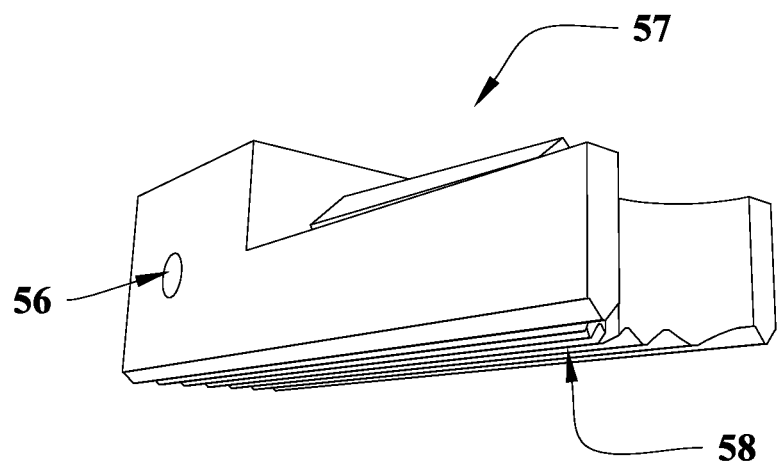
FIG. 20 depicts a bottom-front view of an outboard sliding block.

FIG. 20 shows a bottom-front isometric view of an outboard sliding block 57 which has a grooved bottom face and an alignment rod hole 56.

Figure 21:
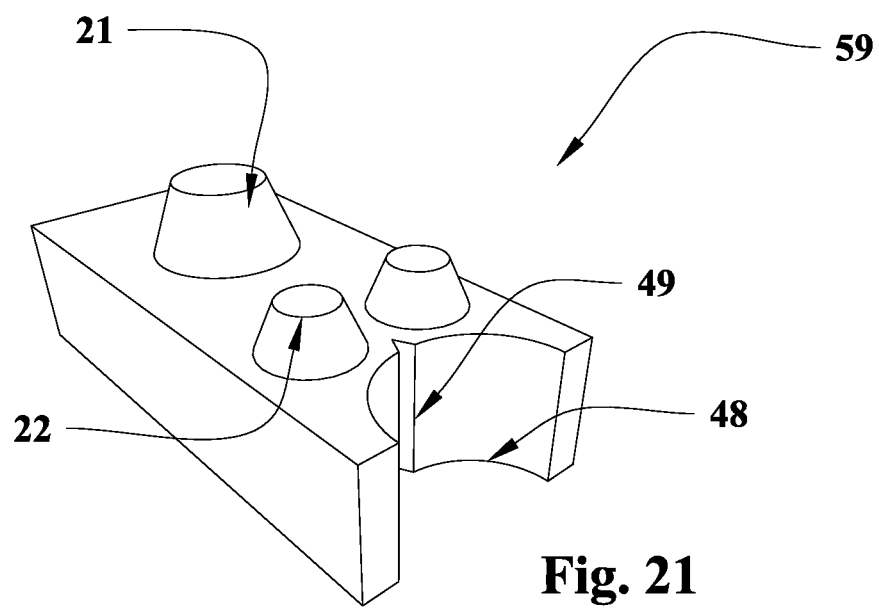
FIG. 21 depicts a top-front view of a pin adapter.

FIG. 21 shows a top-front isometric view of a pin adapter 59. A center index pin 21 and two index pins 22 extend upward from the top surface of the adapter. A dowel recess hole 48 is formed in the front of the adapter, and a centerline groove 49 marks the center of the pin adapter.

Figure 22:
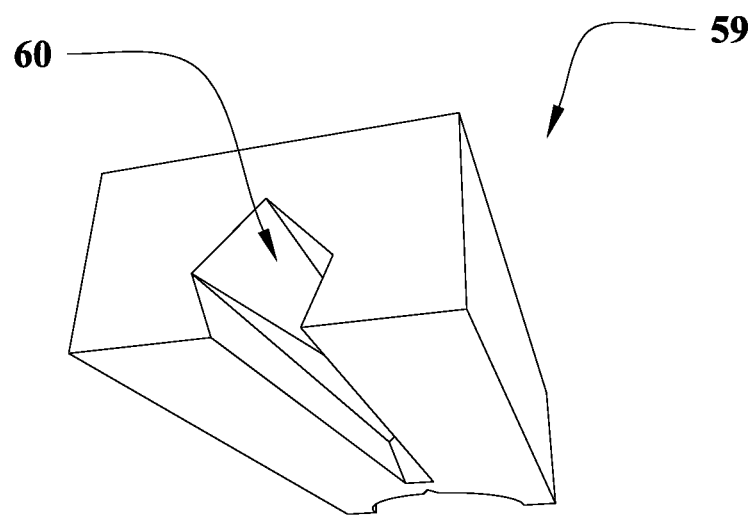
FIG. 22 depicts a bottom-rear view of a pin adapter.

FIG. 22 shows a bottom-rear view of a pin adapter 59 and an adapter flange slot 60.

Figure 23:
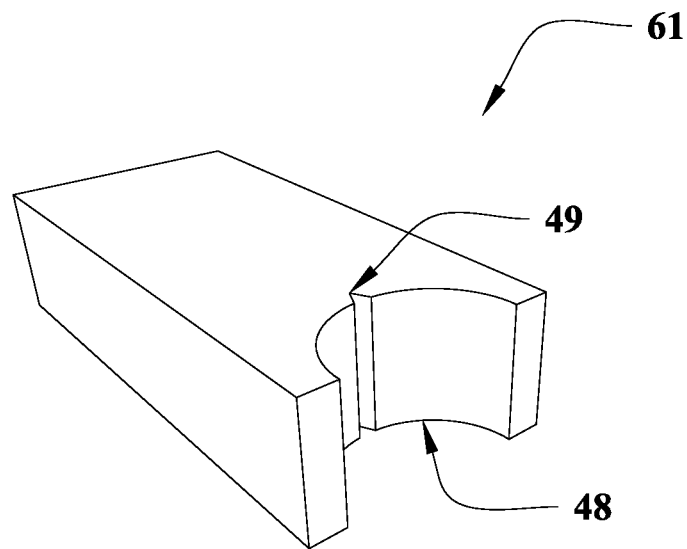
FIG. 23 depicts a top-front view of a blank adapter.

FIG. 23 shows a front-top view of blank adapter 61. The top surface of the blank adapter has no index pins, but blank adapters do have a dowel recess hole 48 and a center line groove 49.

Figure 24:
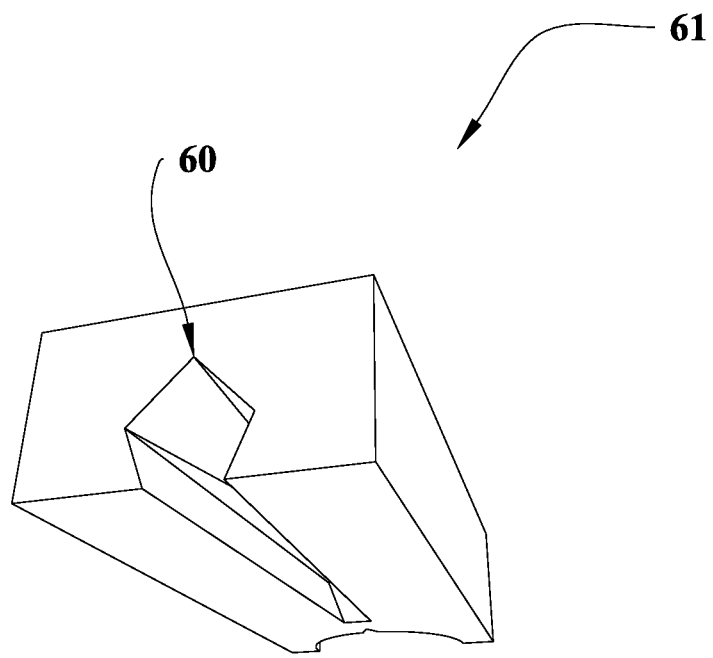
FIG. 24 depicts a bottom-rear view of a blank adapter.

FIG. 24 shows a bottom-rear isometric view of a blank adapter 61. An adapter flange slot 60 is formed in the base of the blank adapter that extends from the rear to near its front.

Figure 25:
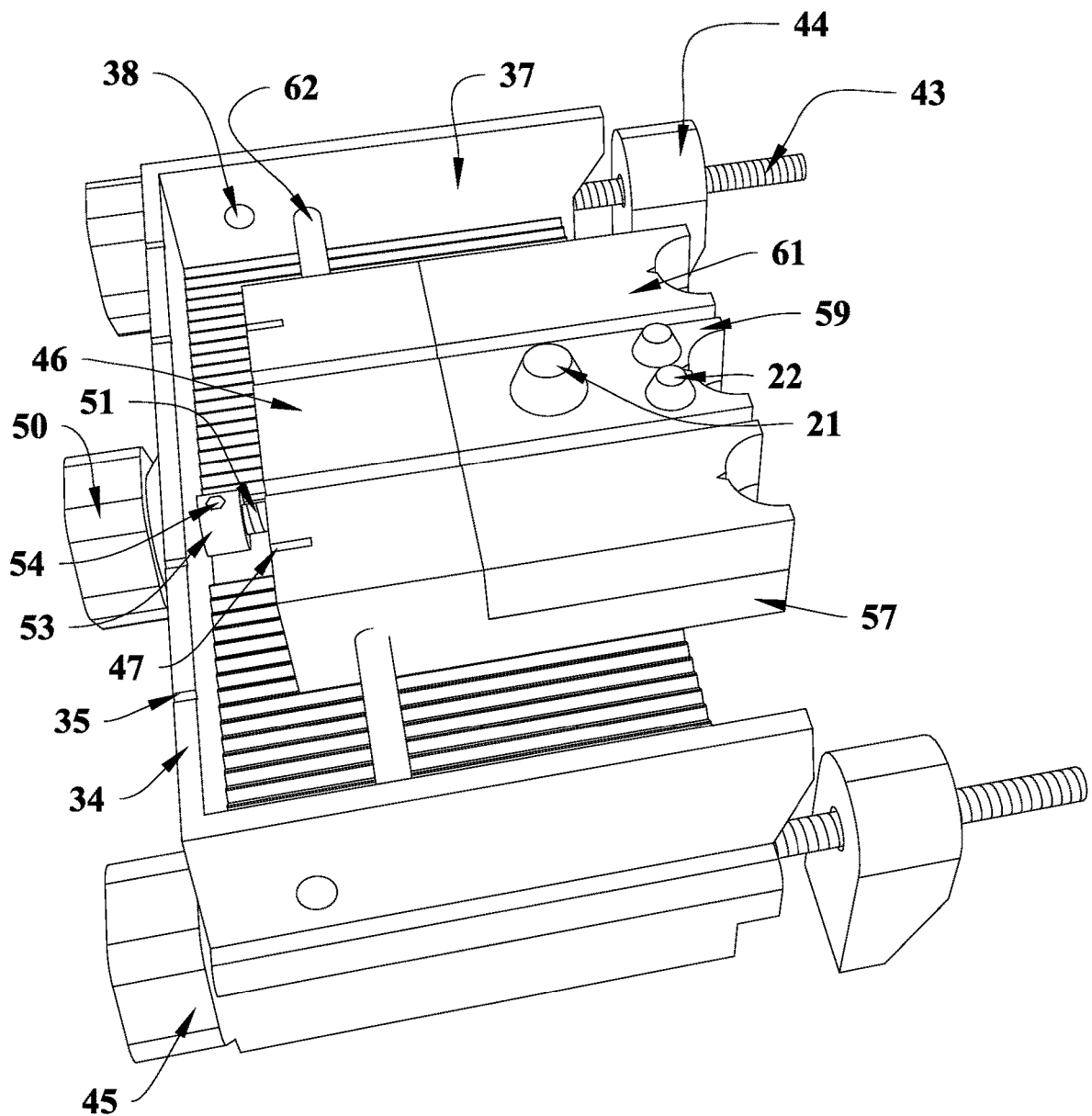
FIG. 25 depicts the operable components of a dowel jig attachment.

FIG. 25 shows the moveable components of the dowel jig attachment in position in the dowel jig body. The clamp rod knob 45 is attached to a threaded clamp rod 43. A clamp bracket is threaded onto each threaded clamp rod. A control rod knob 50 is rigidly connected to a threaded control rod 51 that passes through the back wall 34 of the dowel jig body. A control rod collar 53 is fixed to the threaded control rod via a set screw 54. The threaded control rod extends into the central sliding block 46, through the short length of threaded hole, and into the control rod operating space. A smooth alignment rod 62 passes laterally through the rear portion of the central sliding block 46 and all outboard sliding blocks 57. One pin adapter 59 is shown in position on a center sliding block 46.

A blank pin adapter 61 is shown on each outboard sliding block 57. All sliding blocks, the pin adapter, all blank adapters, and the alignment rod move when the control rod knob is rotated.

Figure 26:
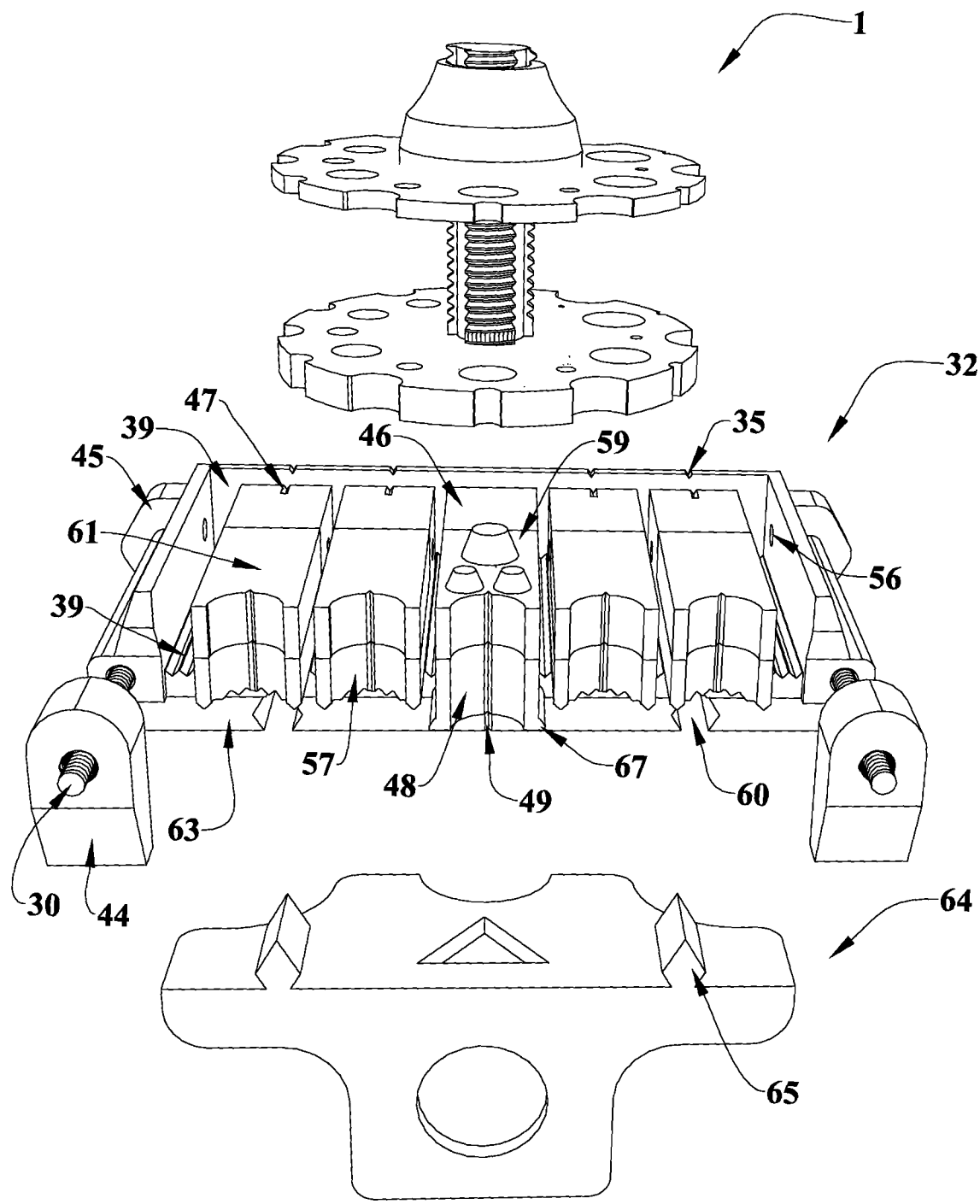
FIG. 26 depicts an exploded view of a drill guide and dowel jig attachment.

FIG. 26 shows a top-front isometric, expanded view of the drill guide 1, the dowel jig attachment 32, and the dowel jig brace 64. When fully assembled, the drill guide rests on the dowel jig attachment with its index recesses engaged with the index pins on the pin adapter. Likewise, the brace fixtures on the dowel jig brace slide into the brace fixture slots 41 locking the brace to the dowel jig attachment. A center sliding block 46 and pin adapter 59 are located at the center of the dowel jig, and multiple outboard sliding blocks 57 with multiple blank adapters 61 are positioned on either side of the center sliding block in this arrangement. The single pin adapter can be interchanged with any one of the blank adapters creating multiple arrangements. The dowel jig is placed on an edge of a work piece with its ledge 63 bearing on the edge of the work piece.

Standard dowel jig spacing is produced when adapter center notches 47 and outboard sliding blocks 57 align with jig spacing index notches 35 formed in the rear wall of the dowel jig body.

Description of Operation

Drill Guide

In this preferred embodiment, the drill guide is comprised of a bottom plate, top plate, and double nut as shown in FIG. 1. The bottom plate has a threaded shaft attached to the center of its top surface. Three alignment grooves interrupt threads on the shaft. The top plate can slide freely along the shaft because the non-circular hole in the threaded collar conforms to the cross-sectional shape of the shaft attached to the bottom plate. The bases of the three alignment grooves provide three points of support and stability to the upper plate like that of a milking stool.

As shown in FIG. 7, the upper section of the double nut has internal threads that engage threads on the shaft. The lower portion of the double nut has internal threads that engage the threaded collar. A double nut moves up and down the shaft when rotated. When collar threads in the lower portion of the double nut engage threads on the threaded collar, the top plate becomes fixed in position, but is not yet firmly supported. The top plate becomes firmly fixed in position when the base of the double nut contacts the top plate. In this embodiment, one alignment groove is made larger than the others so that the top plate cannot be placed on the shaft with holes and notches out of alignment.

The top plate slides freely along the shaft when not engaged by the double nut. Users measure the length of bit extending beyond the jaws of the drill chuck, then subtract the desired hole depth to obtain what is termed the separation distance, delta. Users then position the top plate on the shaft so that the distance between the top of the top plate and the bottom of the bottom plate is equal to delta. Depth graduations are marked on the shaft, so it is not necessary to physically measure the distance between plate surfaces. Users simply position the top plate on the shaft so that the top of the collar is aligned with the proper depth graduation. Users fully thread the double nut onto the threaded collar fixing the top plate in the position for drilling to a particular depth. Partial engagement between threads in the double nut and threads on the collar fix the top plate in position. Fully advancing a double nut until its base strikes the top plate stabilizes the top plate on the shaft.

Users can visually mark planned hole locations on work surfaces using, for example, a pencil or punch. They may also drill into the working surface at the marked location just sufficiently to physically mark the location. If drilling depth is large, a great length of bit will extend below the bottom plate when the bit is fully inserted into the proper holes in the top and bottom plates. Users can simply insert the bit into the marked location while holding the drill guide above the working surface so that they can observe that the bit is properly located. After the bit has been properly seated into the marked location, users can lower the drill guide to the working surface and drill the hole.

When drilling very shallow holes, it may be necessary to view marked hole locations through the holes in the top and bottom plates with no bit being placed within the drill guide. This technique is most useful when drilling large diameter holes. Alternatively, users can insert a rod of the same diameter as the bit held within the chuck jaws into the selected holes in the drill guide, place the point of the rod on the marked hole location, then lower the drill guide down to the working surface. Users then withdraw the rod, insert the drill bit into the drill guide, and operate the drill with one hand while holding the drill guide with their other hand until the jaws meet the top plate. Holes aligned perpendicular to working surfaces are thus drilled to proper depths.

There is no marring of working surfaces because rotating jaws of drill chucks do not contact working surfaces. Splintering of wood is reduced because bottom plates bear down on working surfaces while holes are being drilled.

Depth adjustments can be made without fully disassembling the drill guide and without using tools, so there is little risk that drill guide components or tools will get lost. Many depth stop tools involve sleeves or similar devices that cover great lengths of drilling tools and increase the length of drilling tool required to reach great depths of drilling. This invention does not employ sleeves or collars that attach to drilling tools. The entire length of bit exposed beyond the drill chuck, except for the combined thickness of the top and bottom plates of the drill guide, can be used in drilling holes. The top and bottom plates of the drill guide can be thin; thus, this invention allows users to drill holes to the nearly the full length of their drilling tools. This invention reduces the need for users to purchase long drilling tools.

Drill Guide with Canting Base Attachment

The shanks of drilling tools having bits that are larger than their shanks can be placed against corresponding notches in the two plates of the drill guide. However, the drill guide must be raised above the working surface to provide the space necessary for the bit. This can be done by placing a simple wood block near the planned hole location, then placing the drill guide on the wood block. However, this provides less versatility and stability compared to that provided by the canting base attachment because the canting base has a drill bit recess in its front end and a grooved base that allows for drilling holes through cylinders.

Users first place the drill bit point on the working surface at the proper location. The canting base assembly (drill guide and canting base attachment) is then moved into position so that the proper semi-circular notches engage the shank. Holes can be drilled to prescribed depths that are aligned perpendicular to the working surface using the canting base assembly.

Inclined holes can be drilled into flat working surfaces using the canting base assembly and appropriate drilling tools. Users lower the canting shaft below the bottom surface of the canting base attachment so that the canting base is properly inclined when placed on the working surface, then secure the canting shaft by turning the knob at the rear of the canting base closing the gap and fixing the shaft in place. The angle graduation on the canting shaft aligned with the top of the canting base attachment indicates the actual angle of inclination.

Users mark the planned hole location on the working surface, then strike a line that is aligned with the plane passing through the drill bit when properly inclined and oriented. Users place the canting base assembly on the working surface with the bit point at the planned hole location and center alignment notch in the canting shaft edge positioned on the line. Users then operate the drill creating a hole of the correct depth, inclination, and alignment.

Holes can be drilled through the center of large and small cylinders using the canting base assembly in fields and shops. Cylinders do not need to have free ends that allow users to insert them into existing devices. Holes can be aligned perpendicular to, or inclined from, the cylinder's axis. The canting base automatically aligns itself with the longitudinal axis of cylinders when placed upon them because the canting base has a grooved bottom surface that runs from front to rear. No tools are required for this operation.

In most cases, users can verify that the canting base assembly is at the proper point on the cylinder by visually observing that the drill bit point is at the marked hole location. Angles of inclination must be measured, not read from the angle graduations, when drilling into cylinders. If field conditions do not permit direct viewing of the marked point and drill bit point while drilling the hole, users can position the canting base assembly on the cylinder so that a rod inserted through the selected holes in the drill guide strikes the marked hole location, then mark a new target point on the cylinder beneath the center alignment notch in the canting shaft edge. Users then hold the drill in one hand and the canting base assembly in the other hand while holding the center notch over the target point.

Drill Guide with Dowel Jig Attachment

This invention comprising a drill guide with dowel jig attachment allows users to drill multiple equally spaced-apart and accurately aligned dowel holes to precise depths into the edges and faces of planar work pieces. Dowel holes will be automatically aligned at some constant distance from an edge, evenly spaced apart by gauged distances, and aligned perpendicular to work surfaces.

In this preferred embodiment, the dowel jig and index system combine to allow users to drill up to five evenly spaced and properly aligned dowel holes at one jig setup location in the edges or faces of planar work pieces. The jig's center and outboard blocks move in unison along parallel grooved tracks. Outboard sliding blocks can be shifted left and right relative to the center sliding block providing numerous gauged spacing distances between dowel holes. This invention supports the use of standard dowel spacing intervals by providing jig spacing index notches on the back wall of the dowel jig body, center notches on the adapters, and compatible groove widths in the surfaces of the dowel jig body. For example, there is a European standard spacing of 32 mm, and a US standard spacing of 1¼ inches. This invention can support either of these standard spacings, but not simultaneously. This invention can support numerous non-standard spacings.

The front faces of the sliding blocks are in the same plane as the drill bit and allow users to accurately position dowel holes at marked locations. This invention provides infinite control over position relative to the thickness of an edge, and numerous gauged spacing distances.

The dowel jig attachment has one pin adapter and multiple blank adapters that can be easily attached to and separated from sliding blocks. An adapter flange slot formed in the bottom surface of each adapter engages the adapter fixture projecting from the top surface of each sliding block. Users attach adapters to sliding blocks by sliding them on and off. The adapters are held firmly in place in five of six possible directional movements (up, down, left, right, and rearward) when attached. Users can freely slide the adapters forward to disengage them from the sliding blocks.

Pin adapters have a center index pin and two index pins that project upward from their top surfaces whereas blank adapters have no projecting index pins. Index recesses in the bottom surface of the bottom plate of the drill guide engage the projecting pins on the pin adapter effectively attaching the drill guide to the dowel jig. Pin adapters and blank adapters can be attached to any of the sliding blocks.

Users mark a first dowel hole point on and edge of a work piece, then mark orthogonal lines through the point aligned parallel to (horizontal line) and perpendicular to (vertical line) the edge forming a large plus sign. The dowel jig attachment with its brace but with no adapters is attached to the work piece with the center line groove in the selected sliding block lined up with the vertical line of the plus sign. The clamp rod is then rotated until the jig is firmly secured to the work piece. The dowel jig is then correctly positioned relative to the vertical line. The control rod is then rotated until the front face of the sliding block lines up with the horizontal line of the plus sign. The dowel jig is then properly positioned to drill dowel holes.

The left-most or right-most sliding outboard block will typically be selected as the starting point. Thus, the pin adapter will typically be first attached to one of those outboard sliding blocks. Blank adapters will be attached to the other sliding blocks. The pin adapter, adjacent blank adapters, and side walls of the dowel jig support the drill guide vertically and horizontally during drilling operations. However, users must apply a small rearward force on the drill guide while drilling to maintain proper engagement between the pin adapter and the selected sliding block. Users position the drill guide on the pin adapter with the appropriately sized hole centered over the planned dowel hole location, then drill the hole. Users swap the pin adapter and the adjacent bank adapter in position, then drill the next dowel hole. If more than five dowel holes are to be drilled, users can drill five holes at a first position, then move the attachment to a new position that aligns the first new dowel hole with the last hole drilled. The dowel jig attachment can then be reattached to the work piece allowing more holes to be drilled at the same spacing.

When drilling holes in the faces of work pieces, a straight edge tool (standard) is fastened to the face of the work piece with its long axis aligned parallel to, but offset from, the planned line of dowel holes. The dowel jig attachment is then clamped to the standard in the proper position. The control rod is then rotated until the center groove in the selected sliding block and front face of the sliding block are properly aligned with the plus sign over the marked dowel hole location.

Clamping of a dowel jig attachment to a work piece or the standard allows users to more accurately locate and drill holes to prescribed depths and orientations, and to do that work safely as both hands can be used to hold and stabilize the drill and drill guide. This invention allows the drilling of equally spaced dowel holes of multiple sizes to prescribed depths that are perpendicular to work pieces.

OTHER EMBODIMENTS

Other embodiments can be produced that may prove to be beneficial in terms of production cost, durability, and/or functionality. For example, the threaded shaft on the drill guide can be replaced by a smooth cylindrical shaft if a sufficiently strong clamping device is used to secure the top plate to the shaft. This approach would perhaps be better if the two plates were composed of metal rather than plastic. Such an embodiment would provide infinite control of depth whereas the preferred embodiment allows users to position the top plate with an accuracy about equal to the pitch of the threads on the shaft. The preferred embodiment rigidly holds the top plate in position on the shaft with no risk of slippage.

The top and bottom plates of the drill guide shown in the preferred embodiment can be composed of thermal set plastics and can function as bushings. The top and bottom plates can be configured to act as metal bushing carriers in another embodiment. In this embodiment, the top and bottom plate will support thin metal bushings of variable sizes. In yet another embodiment, the entire drill guide can be composed of metal.

In yet another embodiment, top and bottom circular plates in the preferred embodiment can be replaced by triangular plates that serve as bushing carriers. A large hole can be formed near each of its three apexes that holds a metal bushing. A V-shaped notch at each apex can replace the semi-circular notches in the preferred embodiment. The number of index recesses would be reduced to just three. Three different bushing sizes can be available for use at any point in time. Such an embodiment would have the same functionality as the preferred embodiment, would have a much longer service life, but would be more costly to produce.

Thin metal sheets having punched holes can be placed on the top or bottom surfaces of the top and bottom plates to serve as bushings. These will extend the service life of drill guides at a relatively low cost.

The sliding blocks and adapters of the preferred embodiment can be incorporated into one, fully rectangular body having a hole near its outer end that supports replaceable metal bushings of various internal diameters. There is no need for a pin adapter with this alternative embodiment. However, a conventional collar-type depth stop must be attached to the bits if drilling depth is to be controlled. Dowel holes can be drilled without using the drill guide with this embodiment. This embodiment becomes an independent invention not linked to the drill guide.

Method of Manufacture

This invention, save metal rods, inserts, nuts, and other small components, can be composed of thermal set plastics produced using injection molding techniques. Some limited post-injection processing may be required for the attachments. For example, it might be desirable to install hollow, cylindrical metal inserts having external and internal threads in holes formed in plastic components that will engage threaded metal rods.

Alignment grooves in the shaft of the drill guide in the preferred embodiment are formed using straight lines. Alignment grooves can have other shapes, including semi-circular, to enable more efficient or practical fabrication.

Thin metal discs having the same fully circular holes and semi-circular notches as those produced in plastic top and bottom plates, but slightly undersized, can be incorporated into the production of parts produced using injection molding. These metal plates would likely be placed into the injection mold before injection takes place. Index recesses can be punched or drilled into the bottom plate. Alternatively, metal plates might be affixed to the top and bottom plates after injection using a thermal process. Metal bushings can be incorporated into the top and bottom plates to extend the life of the drill guide. This invention can also be produced using mostly metal components. The shaft might be formed on lathe or NRC machine In this way, a more durable tool can perhaps be produced.

Plastics used in injection molding processes should have high strength, hardness, and a high melting temperature. Thermal set plastics do not change shape when heated to moderate temperatures that might be produced by hot bits. The drill guide can be formed using ceramic materials for little cost that have high durability and are non-conductive.

What is claimed is:

1. A system that allows users to hold and align drilling tools at variable angles to working surfaces while drilling holes to fixed depths, to use and align drilling tools having bits that are as large or larger in diameter than their shanks, to drill holes to precise depths through cylinder centers at variable angles, to drill precisely aligned and spaced dowel holes on both edges and faces of work pieces, to drill holes without marring working surfaces and to reduce wood splintering, said system comprising:
   a. a drill guide configured to guide the bits, the drill guide comprising:
      a bottom plate configured to locate the bits relative to the working surfaces,
      a top plate configured to be spaced from the bottom plate and align the bits relative to the working surfaces, and
      a double nut configured to secure the top plate relative to the bottom plate,
   b. a canting base attachment configured to set the drill guide at a tilted orientation relative to the working surfaces, and
   c. a dowel jig attachment configured to align the drill guide in a plurality of locations spaced from each other for drilling the dowel holes.

2. The system according to claim 1, said bottom plate being
   a circular plate with multiple circular holes and semicircular edge notches of various sizes arranged about a center of the circular plate and having a top surface and a bottom surface,
   the drill guide further comprising:
      a. a long, shaft attached to the top surface of the bottom plate at the center of said bottom plate, the shaft having threads and a multiplicity of axial alignment grooves interrupting the threads, and b. an indexing system on the bottom surface of said bottom plate.

3. The system according to claim 2, said top plate being a circular plate having the same diameter as said bottom plate and comprising:
   a. multiple circular holes and semi-circular edge notches matching or nearly matching the holes and notches in said bottom plate in size and arrangement, and
   b. an integral collar above a center of said top plate having an axial non-circular hole and external collar threads.

4. The system according to claim 3, said double nut comprising:
   a. an upper section having an axial threaded hole that conforms to the threads of the shaft, and
   b. a lower section having an axial threaded hole that conforms to the external collar threads of the integral collar.

5. The system according to claim 3, the non-circular hole conforming to a cross-sectional shape of the shaft.

6. The system according to claim 2, said indexing system comprising:
   a. a center index recess in the center of the bottom plate in said bottom surface of the bottom plate, and
   b. numerous shallower index recesses arranged around said center index recess in the bottom surface of the bottom plate.

7. The system according to claim 6, said canting base attachment comprising:
   a. a thick, circular pad including a bottom surface, a top surface, an aft end, and a front end, the circular pad having the same diameter as said bottom plate and including left and right projections extending from the aft end,
   b. a straight V-shaped groove in the bottom surface of the circular pad,
   c. a large axial, semi-circular drill bit recess hole at the front end of said circular pad that is laterally centered on the groove,
   d. two upright planar faces adjacent to said drill bit recess hole, the planar faces being perpendicular to an axis of the groove and having bottom edges forming a pivot line,
   e. a canting shaft between the left and right projections, and
   f. indexing components on the top surface of the circular pad, the indexing components being configured to engage the indexing system in the bottom surface of the bottom plate.

8. The system according to claim 7, said canting base attachment further comprising:
   a. a gap between the left and right projections,
   b. a threaded hole extending through one of the left and right projections that is aligned perpendicular to the V-shaped groove in said circular pad,
   c. a smooth hole extending through an opposite one of the left and right projections that is aligned perpendicular to the V-shaped groove in said circular pad,
   d. a canting shaft hole having the same cross section as said canting shaft extending through the left and right projections that is centered on the gap and forward of the threaded hole and the smooth hole extending through the left and right projections,
   e. a threaded clamping rod positioned in the threaded hole and the smooth hole, and
   f. a knob configured to clamp the left and right projections against the canting shaft via the threaded clamping rod.

9. The system according to claim 7, said indexing components comprising:
   a. a center index projection that conforms to the center index recess in the bottom surface of the bottom plate of the drill guide, and
   b. multiple index projections that conform in size and position to the shallower index recesses in the bottom surface of the bottom plate of said drill guide.

10. The system according to claim 7, said canting shaft comprising:
    a. a constant cross section over most of its length,
    b. a bottom end that narrows to a straight edge aligned perpendicular to the V-shaped groove,
    c. a small notch at the center of the straight edge, and
    d. marked angle graduations along the length of the canting shaft.

11. The system according to claim 1, said dowel jig attachment comprising:
    a. a dowel jig body configured to be positioned near the work pieces,
    b. a dowel jig brace system configured to support the dowel jig body relative to the work pieces,
    c. a dowel jig clamping system configured to secure the dowel jig body against the work pieces,
    d. a center sliding block configured to be slideably interconnected with the dowel jig body,
    e. a multiplicity of outboard sliding blocks configured to be slideably interconnected with the dowel jig body and flank the center sliding block,
    f. a pin adapter configured to selectively be slideably interconnected with one of the center sliding block and the multiplicity of outboard sliding blocks,
    g. a multiplicity of blank adapters each being configured to selectively be slideably interconnected with one of the center sliding block and the multiplicity of outboard sliding blocks,
    h. an alignment control system configured to align the center sliding block and the multiplicity of outboard sliding blocks relative to each other,
    i. a spacing control system configured to set spacing of the center sliding block and the multiplicity of outboard sliding blocks relative to each other, and
    j. a spacing index system configured to indicate a predetermined spacing of the center sliding block and the multiplicity of outboard sliding blocks relative to each other.

12. The system according to claim 11, said dowel jig body comprising:
    a. a thick, roughly rectangular dowel jig block including a front surface and a bottom surface,
    b. an integral back wall rising above the dowel jig block,
    c. two integral side walls rising above the dowel jig block,
    d. a recess above the dowel jig block formed by the integral back wall and two integral side walls,
    e. a center guide slot in the dowel jig block aligned from back to front of the dowel jig block,
    f. two pans on either side of the center guide slot covered with grooves of equal width, and
    g. multiple brace fixture slots in the bottom surface of the dowel jig block.

13. The system according to claim 12, said center guide slot forming left and right grooves in the dowel jig block.

14. The system according to claim 12, said dowel jig brace system comprising:

a. an L-shaped brace including first and second legs, the brace having a multiplicity of brace fixtures extending from the first leg,
b. a multiplicity of brace fixture slots in the bottom surface of the dowel jig block that conform to the shape, length, and position of the brace fixtures, said brace fixture slots extending from the front surface of the dowel jig block towards the integral back wall.

15. The system according to claim 12, said dowel jig clamping fixture comprising:
a. a long, threaded clamp rod,
b. a knob securely fastened to one end of the clamp rod,
c. an elongated clamp bracket having a threaded hole conforming to the threaded clamp rod that fully penetrates the clamp bracket, said clamp bracket being threaded onto the clamp rod,
d. a smooth hole in the dowel jig block that extends from the integral back wall to the front surface of the dowel jig block, said hole receiving the threaded clamp rod.

16. The system according to claim 12, said center sliding block comprising:
a. an elongated body having a rectangular rear section, said rear section having a rear surface and a top surface configured to be aligned with a top of the integral back wall of the dowel jig body when the center sliding block is placed on one of the pans of the dowel jig body,
b. an alignment hole extending transversely through said rear section,
c. a rectangular front section shorter in height than the rear section of the center sliding block,
d. an adapter flange on a top of the shorter section,
e. a flat bottom surface,
f. side walls that conform to the cross-sectional shape of the center guide slot,
g. a semi-circular recess at a front of the center sliding block, and
h. a vertical center alignment notch in a center of a periphery of the semi-circular recess.

17. The system according to claim 16, each of said outboard sliding blocks comprising:
a. an elongated body having a rectangular rear section and a back edge, said rear section having a top surface configured to be aligned with a top of the integral back wall of the dowel jig body when the center sliding block is placed on one of the pans in the dowel jig body,
b. an alignment hole extending transversely through said rear section,
c. a small notch in a center of the back edge,
d. a rectangular front section shorter in height than the rear section of the outboard sliding block,
e. an adapter flange on a top of said front section of the outboard sliding block,
f. a bottom surface having grooves configured to conform to the grooves of one of the pans of said dowel jig body,
g. a semi-circular recess in a front of said outboard sliding block, and
h. a vertical center alignment notch in a center of a periphery of said semi-circular recess of the outboard sliding block.

18. The system according to claim 16, the position control system comprising:
a. a smooth control rod hole through a center of the integral back wall of said dowel jig body,
b. a long, threaded control rod configured to be inserted into the control rod hole,
c. a knob securely fastened to an aft end of said control rod,
d. a control rod collar secured to the threaded control rod so that the control rod collar always bears on the inside face of the integral back wall of said dowel jig body,
e. a recess in the rear face of said center sliding block sufficient in size to contain the control rod collar, and
f. an at least partially threaded hole in said center sliding block,
g. said hole having a smooth portion being slightly larger in diameter than the threaded rod.

19. The system according to claim 12, said pin adapter comprising:
a. an elongated, roughly rectangular body having a top surface and a thickness such that the top surface of said body of the pin adapter is configured to be aligned with the top surface of the rear section of said center sliding block or one of the outboard sliding blocks when placed thereon,
b. a semi-circular notch in a front end of said pin adapter,
c. an adapter flange slot in a bottom base of said pin adapter,
d. a center index pin projecting from the top surface of said pin adapter on a center line through said pin adapter, said center index pin being located such that the drill guide is properly positioned to drill holes through a plane defined by the pin adapter,
e. a multiplicity of shorter index pins projecting from the top surface of said pin adapter, said shorter index pins being located such that said drill guide is properly positioned to drill holes of a specific size through the plane defined by the pin adapter.

20. The system according to claim 19, each of said blank adapters having a top surface and having the same shape and dimensions as said pin adapter except that said blank adapter has no indexing pins on the top surface of said blank adapter.

21. The system according to claim 12, the spacing index system comprising:
a. a multiplicity of index notches formed on a top of the integral back wall of the dowel jig body at standardized intervals, and
b. one index notch formed at a center of a back edge of a top of each of said outboard sliding blocks.

22. The system according to claim 11, said alignment control system comprising:
a. a smooth alignment hole extending transversely and completely through the rear sections of said center sliding block and all said outboard sliding blocks,
b. a long, smooth alignment rod conforming to the diameter of said alignment holes,
c. an alignment rod insertion/removal hole in each integral side wall of said dowel jig body having a diameter somewhat larger than that of said alignment rod.

23. A system that allows users to hold and align drilling tools at variable angles to working surfaces while drilling holes to fixed depths, to use and align drilling tools having bits that are as large or larger in diameter than their shanks, to drill holes to precise depths through cylinder centers at variable angles, to drill precisely aligned and spaced dowel holes on both edges and faces of work pieces, to drill holes without marring working surfaces and to reduce wood splintering, said system comprising:
a drill guide configured to guide the drilling tools,
a canting base attachment configured to set the drill guide at a tilted orientation relative to the working surfaces, and a dowel jig attachment configured to align the drill guide in a plurality of locations spaced from each other for drilling the dowel holes, the dowel jig attachment comprising:
- a. a dowel jig body configured to be positioned near the work pieces,
- b. a dowel jig brace system configured to support the dowel jig body relative to the work pieces,
- c. a dowel jig clamping system configured to secure the dowel jig body against the work pieces,
- d. a center sliding block configured to be slideably interconnected with the dowel jig body,
- e. a multiplicity of outboard sliding blocks configured to be slideably interconnected with the dowel jig body and flank the center sliding block,
- f. a pin adapter configured to selectively be slideably interconnected with one of the center sliding block and the multiplicity of outboard sliding blocks,
- g. a multiplicity of blank adapters each being configured to selectively be slideably interconnected with one of the center sliding block and the multiplicity of outboard sliding blocks,
- h. an alignment control system configured to align the center sliding block and the multiplicity of outboard sliding blocks relative to each other,
- i. a spacing control system configured to set spacing of the center sliding block and the multiplicity of outboard sliding blocks relative to each other, and
- j. a spacing index system configured to indicate a predetermined spacing of the center sliding block and the multiplicity of outboard sliding blocks relative to each other.

* * * * *